(12) United States Patent
Matsunaga et al.

(10) Patent No.: US 7,258,649 B2
(45) Date of Patent: Aug. 21, 2007

(54) SHIFT CONTROL APPARATUS FOR VEHICULAR AUTOMATIC TRANSMISSION AND METHOD THEREOF

(75) Inventors: Hitoshi Matsunaga, Anjyo (JP); Yoshiharu Harada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 63 days.

(21) Appl. No.: 11/232,016

(22) Filed: Sep. 22, 2005

(65) Prior Publication Data

US 2006/0014610 A1    Jan. 19, 2006

Related U.S. Application Data

(62) Division of application No. 10/449,114, filed on Jun. 2, 2003, now Pat. No. 7,001,307.

(30) Foreign Application Priority Data

Jun. 12, 2002  (JP)  ............................ 2002-171273
Aug. 7, 2002  (JP)  ............................ 2002-230405

(51) Int. Cl.
  *F16H 59/48*  (2006.01)
  *G06F 7/00*  (2006.01)
  *G06F 17/00*  (2006.01)
  *G06F 19/00*  (2006.01)
(52) U.S. Cl. ........................................ 477/120; 701/52
(58) Field of Classification Search .................. 701/52; 477/118, 120
  See application file for complete search history.

(56) References Cited

U.S. PATENT DOCUMENTS

| 5,662,549 | A |  | 9/1997 | Kondo et al. |
| 5,823,052 | A |  | 10/1998 | Nobumoto |
| 5,882,277 | A | * | 3/1999 | Iizuka ........................ 477/125 |
| 6,059,689 | A |  | 5/2000 | Shimizu et al. |
| 6,065,360 | A | * | 5/2000 | Hollingsworth et al. ...... 74/335 |
| 6,085,139 | A |  | 7/2000 | Nakauchi et al. |
| 6,128,566 | A |  | 10/2000 | Nishino |
| 6,199,003 | B1 | * | 3/2001 | Hollingsworth et al. ...... 701/52 |
| 6,256,567 | B1 |  | 7/2001 | Toukou |
| 6,503,170 | B1 | * | 1/2003 | Tabata ........................ 477/97 |
| 6,553,856 | B2 | * | 4/2003 | Svendsen ..................... 74/335 |

FOREIGN PATENT DOCUMENTS

| JP | 58-203255 |  | 11/1983 |
| JP | 2-296064 |  | 12/1990 |
| JP | 6-17911 |  | 1/1994 |
| JP | 6-221417 |  | 8/1994 |
| JP | 9-14417 |  | 1/1997 |
| JP | 10-103468 | A | 4/1998 |
| JP | 10-103492 |  | 4/1998 |
| JP | 11-351374 | A | 12/1999 |

\* cited by examiner

*Primary Examiner*—Tisha Lewis
(74) *Attorney, Agent, or Firm*—Oblon, Spivak, McClelland, Maier & Neustadt, P.C.

(57) ABSTRACT

An automatic shift control is executed in an automatic transmission with 5 shift speeds of range hold type in the highest gear stage of a shift range at the manual shift mode. Upon selection of a shift mode from the automatic shift mode to the manual shift mode, the shift range at the manual shift mode is selected in accordance with the vehicle speed detected at the automatic shift mode. If the vehicle speed is in the low-speed range, the shift range 3 is selected. If the vehicle speed is in the medium-speed range, the shift range 4 is selected. If the vehicle speed is in the high-speed range, the shift range 5 is selected.

10 Claims, 14 Drawing Sheets

FIG. 2

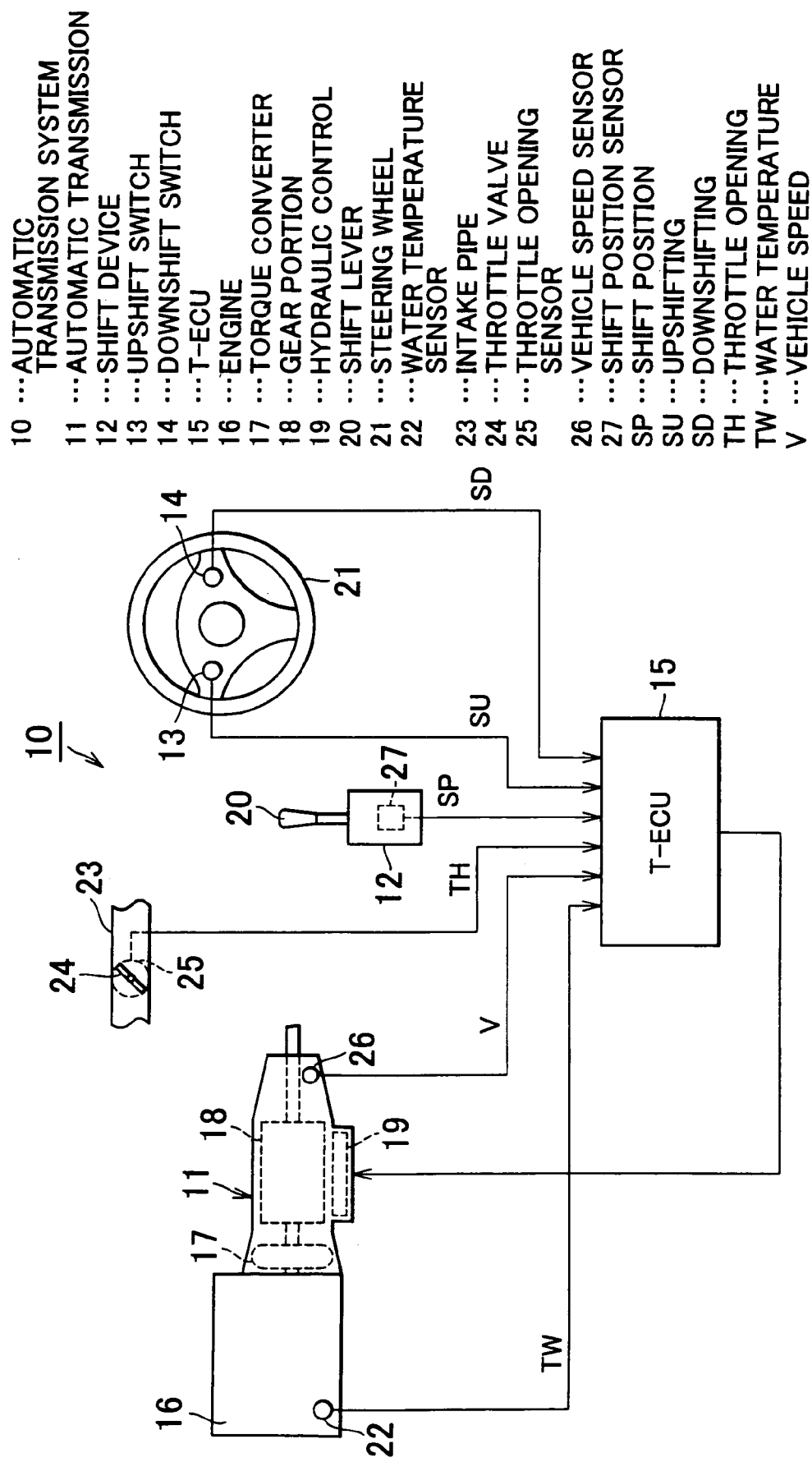

10 ... AUTOMATIC TRANSMISSION SYSTEM
11 ... AUTOMATIC TRANSMISSION
12 ... SHIFT DEVICE
13 ... UPSHIFT SWITCH
14 ... DOWNSHIFT SWITCH
15 ... T-ECU
16 ... ENGINE
17 ... TORQUE CONVERTER
18 ... GEAR PORTION
19 ... HYDRAULIC CONTROL
20 ... SHIFT LEVER
21 ... STEERING WHEEL
22 ... WATER TEMPERATURE SENSOR
23 ... INTAKE PIPE
24 ... THROTTLE VALVE
25 ... THROTTLE OPENING SENSOR
26 ... VEHICLE SPEED SENSOR
27 ... SHIFT POSITION SENSOR
SP ... SHIFT POSITION
SU ... UPSHIFTING
SD ... DOWNSHIFTING
TH ... THROTTLE OPENING
TW ... WATER TEMPERATURE
V ... VEHICLE SPEED

SP ··· SHIFT POSITION
SU ··· UPSHIFTING
SD ··· DOWNSHIFTING
TH ··· THROTTLE OPENING
TW ··· WATER TEMPERATURE
V ··· VEHICLE SPEED

| SHIFT POSITION | SHIFT SPEED |
|---|---|
| D | 1st ⇔ 2nd ⇔ 3rd ⇔ 4th ⇔ 5th |
| 2 | 1st ⇔ 2nd |
| L | 1st |

SHIFT SPEED AT EACH SHIFT POSITION

SHIFT RANGE SELECTION CONTROL IN POSITION M

| SHIFT RANGE | SHIFT SPEED |
|---|---|
| 5 | 1st ⇔ 2nd ⇔ 3rd ⇔ 4th ⇔ 5th |
| 4 | 1st ⇔ 2nd ⇔ 3rd ⇔ 4th |
| 3 | 1st ⇔ 2nd ⇔ 3rd |
| 2 | 1st ⇔ 2nd |
| L | 1st |

SHIFT SPEED AT EACH SHIFT RANGE

EGLD···ENGINE LOAD

ACCF···ACCELERATOR OPERATING SPEED

SHIFT CONTROL APPARATUS FOR VEHICULAR AUTOMATIC TRANSMISSION AND METHOD THEREOF

CROSS REFERENCE TO RELATED APPLICATION

This application is a divisional of application Ser. No. 10/449,114, filed Jun. 2, 2003, now U.S. Pat. No. 7,001,307 the entire contents of which are incorporated herein by reference.

INCORPORATION BY REFERENCE

The disclosure of Japanese Patent Applications No. 2002-230405 and 2002-171273 filed on Aug. 7, 2002 and Jun. 12, 2002, including the specification, drawings and abstract are incorporated herein by reference in their entirety.

BACKGROUND OF THE INVENTION

1. Field of Invention

The invention relates to a shift control apparatus for a vehicular automatic transmission and a shift control method, which allow a vehicle operator to perform manual selection of gear stages.

2. Description of Related Art

When the gear stage is in a drive (D) position operated by the vehicle operator using the shift device, a shift control apparatus of the automatic transmission for the vehicle serves to select an appropriate gear stage in accordance with the current operating state of the vehicle. Then a hydraulic control portion of the automatic transmission is controlled such that the gear is automatically changed to the selected stage.

The operating state of the vehicle is determined by the shift control apparatus based on a throttle opening and a vehicle speed, for example, and the gear stage is selected so as to provide the fuel efficiency and power most suitable for the operating state.

There has been introduced an automatic transmission that allows the vehicle operator to manually change gear stages in order to realize not only the aforementioned function but also the vehicle operation that reflects the intention of the vehicle operator.

In the shift control apparatus in the automatic transmission for a vehicle disclosed in JP-A-6-221417, for example, the shift device includes ranges D, and B that can be selected from the range D by manual operation of the vehicle operator. The shift device further includes an upshifting position and a downshifting position that can be selected in the range B. An electronic control unit that serves to perform shift control of the automatic transmission becomes an automatic shifting mode in the range D such that the appropriate gear stage can be automatically selected in accordance with the operating state of the vehicle. Upon change in the shift range from the range D to B, the electronic control unit sets a manual transmission mode where the gear stage is downshifted so as to be lower than the gear stage that has been selected in the range D. When the vehicle operator performs downshifting in the range B, the electronic control unit downshifts the gear to be one stage lower. Meanwhile, when the vehicle operator performs upshifting in the range B, the electronic control unit upshifts the gear to be one stage higher.

In order to obtain the engine braking force higher than that obtained in the gear stage that has been set during running at the automatic transmission mode, the vehicle operator changes the shift range from the range D to B using the shift lever so as to perform downshifting to the gear as being one stage lower. In order to obtain higher acceleration torque or the torque for running uphill, the aforementioned change in the shift range is performed to establish the gear to be one stage lower.

In the state where the automatic transmission includes 5 shift speeds, when the vehicle operator releases the accelerator pedal during running in the 3rd speed at the automatic transmission mode, upshifting from the 3rd to the 5th speed is performed by the electronic control unit in response to the operating state of the vehicle, that is, the state of the throttle valve which has been fully closed.

When the vehicle operator changes the shift range from the range D to B for downshifting to apply further higher engine braking force, the downshifting is performed from the 5th to the 4th speed. Then further downshifting in the range B changes the gear stage from the 4th to the 3rd speed.

In the above case, the engine braking force required by the vehicle operator cannot be obtained because the gear stage has been originally set in the 3rd speed at the automatic transmission mode. The vehicle operator, therefore, has to perform further downshifting from the 3rd to the 2nd speed.

Depending on the operating state of the vehicle, the vehicle operator has to perform downshifting twice so as to obtain the required engine braking force. Even in the state where the 5th speed is set in the range B at the manual transmission mode and the vehicle operator releases the accelerator pedal, the gear is held in the 5th speed by the electronic control unit.

If the vehicle is running downhill in the aforementioned state, the vehicle will be accelerated without depressing the accelerator pedal. When the vehicle operator performs downshifting once for the purpose of applying the higher engine braking force just before entering to a sharp curve while running downhill, the gear stage is shifted from the 5th to the 4th speed.

As the engine braking force obtained in the 4th speed is insufficient in the above case, the vehicle operator has to perform further downshifting once to the 3rd speed.

SUMMARY OF THE INVENTION

It is an object of the invention to provide a shift control apparatus for a vehicular automatic transmission in which a shift mode is selected between an automatic transmission mode for automatically setting a gear stage and a manual transmission mode for manually setting the gear stage by a manual operation of the vehicle operator such that the required gear stage can be established by the reduced frequency of the manual shifting operation.

It is further an object of the invention to provide a shift control apparatus for a vehicular automatic transmission which allows establishment of the required gear stage by the reduced frequency of the manual shifting operation after changing the shift mode from the automatic mode to the manual mode.

It is still further an object of the invention to provide a shift control apparatus for a vehicular automatic transmission which allows establishment of the required gear stage by the reduced frequency of the manual shifting operation at the manual shifting mode.

In an embodiment of the invention, a shift control apparatus for a vehicular automatic transmission sets an automatic shift mode in which a gear stage is established based on a first vehicle operation information used for selecting a gear stage of the automatic transmission, and a manual shift mode in which the gear stage is established by a manual shift operation. The shift mode is manually selected between the automatic shift mode and the manual shift mode. Further the gear stage upon selection of the shift mode from the automatic shift mode to the manual shift mode is set based on a second vehicle operation information which is different from the first vehicle operation information.

According to the embodiment, at the automatic shift mode, the gear stage selected based on the first vehicle operation information is set in the automatic transmission. Upon selection of the shift mode from the automatic shift mode to the manual shift mode, the gear stage is set based on the second vehicle operation information that is different from the first vehicle operation information. This makes it possible to set the gear stage upon selection of the shift mode from the automatic shift mode to the manual shift mode so as to be different from the gear stage set at the automatic shift mode. The gear stage desired by the vehicle operator can be established with the reduced frequency of the manual shift operation at the manual shift mode.

In an embodiment of the invention, a shift control apparatus for a vehicular automatic transmission sets an automatic shift mode in which a gear stage is established based on a first vehicle operation information used for selecting a gear stage of the automatic transmission, and a manual shift mode in which the gear stage is established by a manual shift operation. The shift mode is manually selected between the automatic shift mode and the manual shift mode. Further the gear stage upon the manual shift operation at the manual shift mode is set based on a fourth vehicle operation information.

In the embodiment, at the automatic shift mode, the gear stage is selected based on the first vehicle operation information, and set in the automatic transmission. Meanwhile, when the manual shift operation is performed at the manual shift mode, the gear stage selected based on the fourth vehicle operation information is set in the automatic transmission. Accordingly, at the manual shift mode, a single manual shift operation makes it possible to set the currently set gear stage to the one at least two stages lower or higher speed such that the appropriate driving force or the engine braking force may be obtained.

In an embodiment of the invention, a shift control apparatus for a vehicular automatic transmission sets an automatic shift mode in which a gear stage is established based on a first vehicle operation information used for selecting a gear stage of the automatic transmission, and a manual shift mode in which a shift range having the gear stage established based on the first vehicle operation information is selected by a manual shift operation. The shift mode is manually selected between the automatic shift mode and the manual shift mode. The shift range upon selection of the shift mode from the automatic shift mode to the manual shift mode is set based on a second vehicle operation information which is different from the first vehicle operation information.

According to the embodiment, at the automatic shift mode, the gear stage selected based on the first vehicle operation information is set in the automatic transmission. At the manual shift mode, the shift range having the gear stage to be set based on the first vehicle operation information by the manual shift operation is changed. When the automatic shift mode is manually changed to the manual shift mode, the shift range is selected based on the second vehicle operation information that is different from the first vehicle operation information. This makes it possible to set the gear stage upon change in the shift mode to the manual shift mode so as to be different from the one selected at the automatic shift mode. As a result, the gear stage desired by the vehicle operator can be established with the reduced frequency of the manual shift operation at the manual shift mode.

In the embodiment, the second vehicle operation information includes a vehicle speed upon selection of the shift mode from the automatic shift mode to the manual shift mode.

The embodiment makes it possible to set the gear stage that is one stage higher than the one where higher driving force or engine braking force is obtained in accordance with the vehicle speed upon selection of the shift mode from the automatic shift mode to the manual shift mode. Unlike the shift control apparatus in which the gear stage at the manual shift mode is at least one stage lower than the gear stage selected at the automatic shift mode, selection of the shift mode to the manual shift mode may avoid unnecessary generation of the engine braking force.

The embodiment limits a highest gear stage set based on the first vehicle operation information at the automatic shift mode so as to be at least one stage lower based on a third vehicle operation information, and sets the shift range having the highest gear stage limited to be at least one stage lower. The second vehicle operation information includes the highest gear stage limited to be at least one stage lower.

According to the embodiment, the highest stage of the gear stage selected based on the first vehicle operation information at the automatic shift mode is limited to be at least one stage lower based on the third vehicle operation information. When the shift mode is changed from the automatic shift mode to the manual shift mode in the aforementioned stage, the shift range having the highest gear corresponding to the limited highest gear stage is set. In the state where the highest gear stage is limited at the automatic shift mode, the gear stage higher than the limited highest gear stage is not established when the manual shift mode is selected. This makes it possible to select the gear stage where the higher driving force or the engine braking force is obtained only by a single downshifting operation.

In the embodiment, the third vehicle operation information includes a slope resistance to a vehicle that runs one of uphill and downhill, based on which the highest gear stage is limited to be at least one stage lower.

According to the embodiment, the highest gear stage set at the automatic shift mode is limited to be at least one stage lower based on the slope resistance to the vehicle that runs uphill or downhill. In the case where the highest gear stage is limited at the automatic shift mode upon running uphill or downhill, the gear stage higher than the limited highest gear stage is not selected upon change in the shift mode to the manual shift mode. This makes it possible to select the gear stage where higher torque for running uphill or the engine braking force is obtained by a single downshifting operation at the manual shift mode.

In the embodiment, the third vehicle operation information includes one of a temperature of cooling water and a temperature of oil for the automatic transmission, based on which the highest gear stage is limited to be at least one stage lower.

According to the embodiment, the highest gear stage set at the automatic shift mode is limited to be at least one stage lower based on a temperature of cooling water or a temperature of oil for the automatic transmission. This makes it possible to avoid selection of the gear stage where the engine speed insufficient to increase the cooling water temperature or the oil temperature is obtained. This makes it possible to select the gear stage where higher driving force or the engine braking force is obtained by a single downshifting operation at the manual shift mode.

In an embodiment of the invention, a shift control apparatus for a vehicular automatic transmission sets an automatic shift mode in which a gear stage is established based on a first vehicle operation information used for selecting a gear stage of the automatic transmission, and a manual shift mode in which a shift range having the gear stage established based on the first vehicle operation information is selected by a manual shift operation. The shift mode is manually selected between the automatic shift mode and the manual shift mode. Further, the shift range upon the manual shift operation at the manual shift mode is set based on a fourth vehicle operation information.

According to the embodiment, when the manual shift operation is performed at the manual shift mode, the shift range selected based on the fourth vehicle operation information is set in the automatic transmission. This makes it possible to directly select the shift range that allows the gear stage to be set such that appropriate higher driving force or the engine braking force is obtained only by a single manual shift operation.

In the embodiment, the manual shift operation is a downshifting operation, and the fourth vehicle operation information is obtained from an accelerator opening caused by the downshifting operation, a current vehicle acceleration, and an acceleration after the manual shift operation at which the gear stage set upon shifting of the shift range to have the highest gear limited to be at least one stage lower is established.

According to the embodiment, the fourth vehicle operation information is derived from the accelerator opening upon downshifting operation at the manual shift mode, the vehicle acceleration, and the acceleration after shifting detected upon establishment of the gear stage to be set upon shifting down to the shift range having the highest gear as being at least one stage lower. The shift range set upon the downshifting is selected based on the fourth vehicle operation information. The shift range set by a single downshifting operation may be selected based on the intention of the vehicle operator to accelerate which is estimated from the accelerator opening, the current vehicle running state, and the vehicle running state upon shifting down to the shift range.

The embodiment limits a highest gear stage set by the manual shift operation at the manual shift mode so as to be at least one stage lower than the highest gear in the shift range based on a third vehicle operation information, and sets the shift range having a highest gear stage that is one stage lower than the limited highest gear stage set upon the downshifting operation performed by the manual shift operation. The fourth vehicle operation information includes the highest gear stage limited to be at least one stage lower.

According to the embodiment, the highest gear stage of the shift range set by the manual shift operation is limited to be at least one stage lower than the highest gear stage based on the third vehicle operation information. When downshifting is performed in the aforementioned state, the shift range having the highest gear stage as being one stage lower than the limited highest gear is selected. Even if the highest gear stage of the shift range set at the manual shift mode is limited to be at least one stage lower, downshifting to the gear stage where higher driving force or higher engine braking force can be obtained is performed by a single downshifting operation. When the highest gear stage selected in the shift range set at the manual shift mode is not limited, the shift range is shifted down to the one having the highest gear stage as being one stage lower at every downshifting operation.

In the embodiment, the third vehicle operation information includes a slope resistance to the vehicle that runs one of uphill and downhill. The embodiment limits the highest gear stage to be at least one stage lower than the highest gear stage in the shift range based on the slope resistance.

According to the embodiment, the highest gear stage of the shift range set by the manual shift operation is limited to the stage that is lower than the highest gear stage based on the slope resistance of the vehicle that runs uphill or downhill. As a result, even if the highest gear stage of the shift range set at the manual shift mode is limited, downshifting to the gear stage where higher driving force for running uphill or higher engine braking force can be obtained is performed by a single downshifting operation.

BRIEF DESCRIPTION OF THE DRAWINGS

FIG. 2 is a block diagram of an automatic transmission;

DETAILED DESCRIPTION OF PREFERRED EMBODIMENTS

First Embodiment

Figure 1:
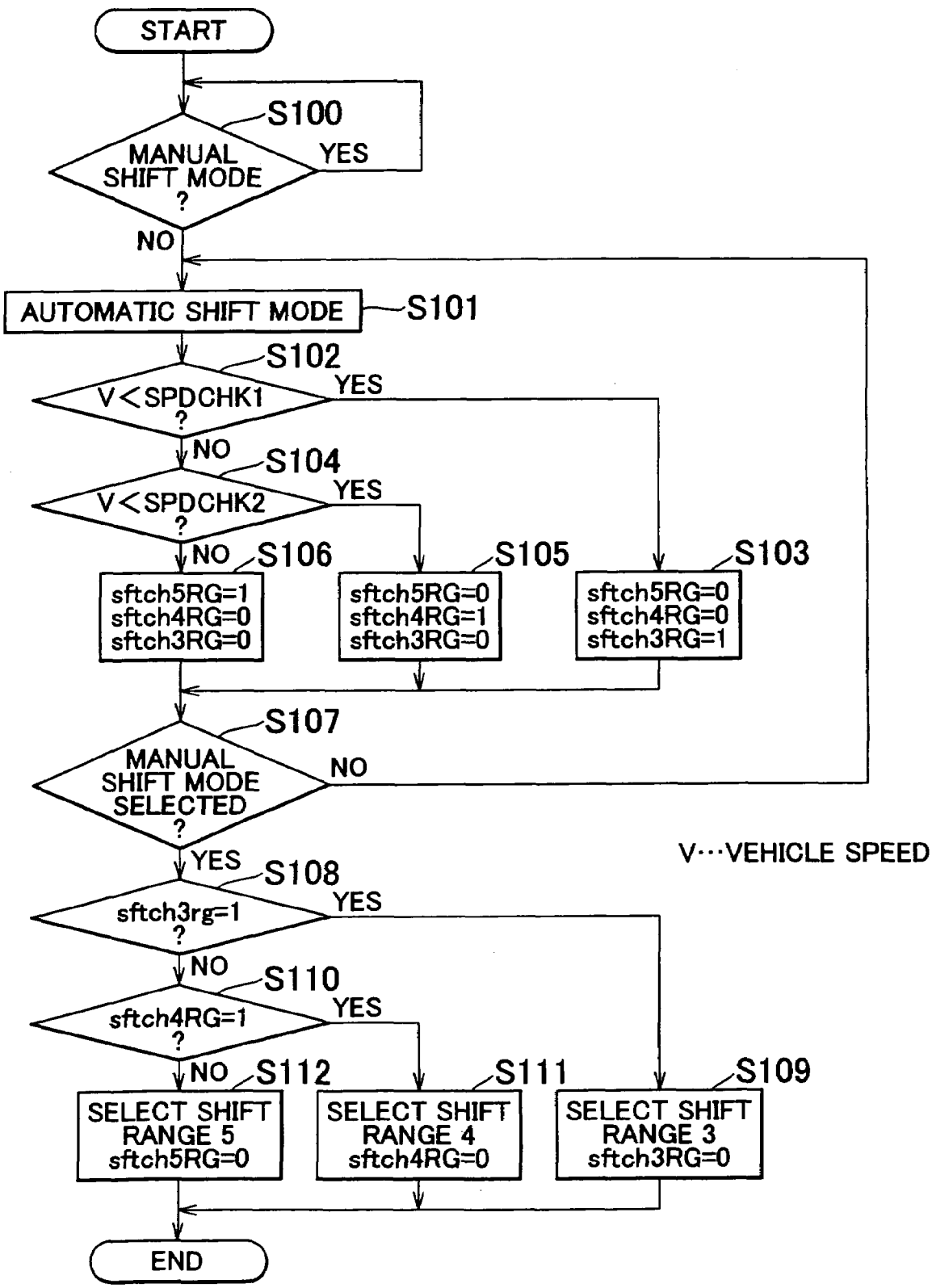
FIG. 1 is a flowchart representing a control routine for setting a first shift range in a first embodiment.

A first embodiment of the invention will be described referring to FIGS. 1 to 7. Referring to FIG. 2, an automatic transmission system 10 mounted in a vehicle includes an automatic transmission 11, a shift device 12, an upshift switch 13, a downshift switch 14, and an electronic control unit for transmission 15 (hereinafter referred as a T-ECU).

The automatic transmission 11 receives an output of a gasoline engine (an internal combustion engine that is referred simply as the engine) 16 via a torque converter 17 so as to be output to a drivetrain (not shown).

The automatic transmission 11 includes a gear portion 18 and a hydraulic control 19. The gear portion 18 includes a plurality of friction engagement elements such as hydraulic clutches and hydraulic brakes in addition to the gear train of a planetary gear type. The gear train connection state is changed to a parking state, reverse state, neutral state, and a forward state by selecting combination of the friction engagement elements to be operated. In the forward state, the gear stage to be established is selected among those speeds including 1st, 2nd, 3rd, 4th, and 5th shift speeds.

A hydraulic control 19 includes a plurality of electromagnetic solenoids each operated on the basis of control signals input from outside. Each operation state of the hydraulic clutches and the hydraulic brakes is changed in accordance with the operating state of each of the electromagnetic solenoids. The operating state of the gear portion 18 is, then, changed to one of the parking state, reverse state, neutral state, and forward state.

The shift device 12, provided aside a driver's seat, includes a shift lever 20 by which the operating state of the automatic transmission 11 is selected to one of the parking state, reverse state, neutral state and forward state.

Figures 4, 5:
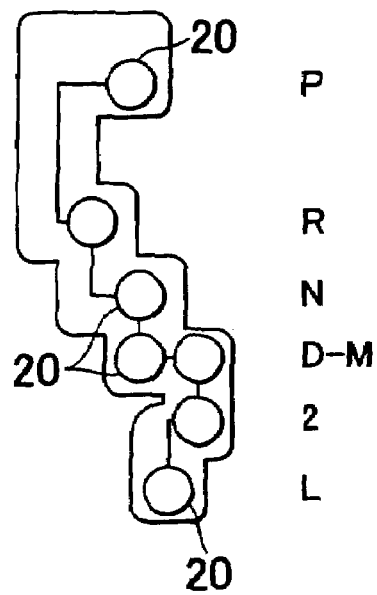
FIG. 4 is a schematic view showing shift positions provided in a shift device.
FIG. 5 is a table representing gear speeds that can be selected in the respective shift ranges D, 2 and L.

Referring to FIG. 4, the shift device 12 has a shift gate provided with shift positions including P (parking), R (reverse), N (neutral), D (drive range), M (manual range), 2 (two-speed range), and L (one-speed range) such that the shift position is selected by the shift lever 20.

Referring to FIG. 2, the upshift switch 13 and the downshift switch 14 are provided on the left and the right portions of a steering wheel 21, respectively. Those upshift and downshift switches 13, 14 are provided so as to be operated by the vehicle operator during the steering operation. The upshift switch 13 is operated by the vehicle operator to intentionally perform upshifting to establish the gear to be one stage higher in the state where the position M of the shift device 12 is selected. Likewise the downshift switch 14 is operated by the vehicle operator to intentionally perform downshifting to establish the gear to be one stage lower in the state where the position M of the shift device 12 is selected.

An electrical system of the embodiment will be described referring to FIG. 2. The engine 16 is provided with a water temperature sensor 22 for detecting a temperature TW of an engine cooling water.

An intake pipe 23 is provided with a throttle opening sensor 25 for detecting a throttle opening TH of a throttle valve 24. The automatic transmission 11 is provided with a vehicle speed sensor 26.

According to the embodiment, the throttle opening TH and the vehicle speed V constitute the first vehicle operation information, and the vehicle speed V constitutes the second vehicle operation information. The shift device 12 is provided with a shift position sensor 27 for detecting a shift position SP.

Figure 3:
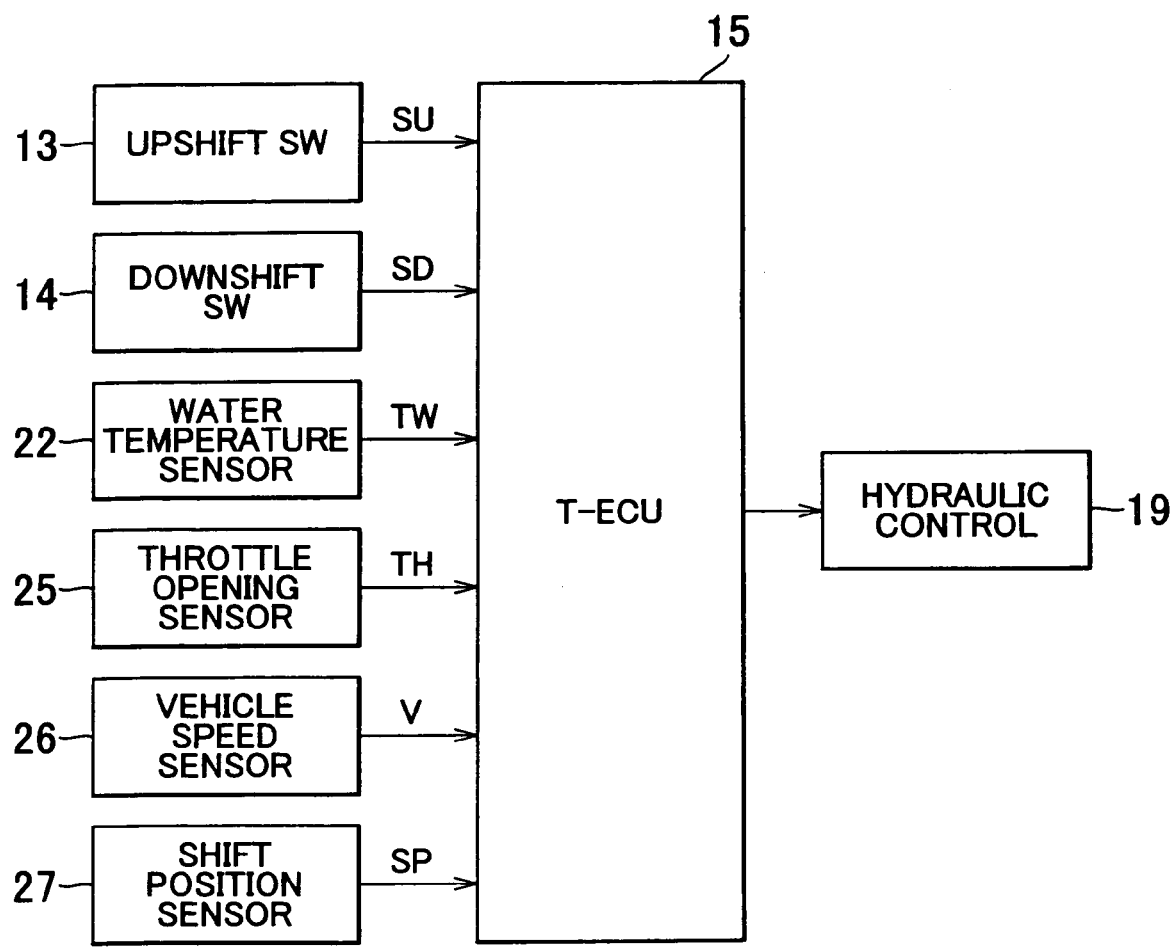
FIG. 3 is a block diagram of an electric system of the automatic transmission.

Referring to FIG. 3, the T-ECU 15 receives operation signals from the upshift switch 13 and the downshift switch 14, respectively, and further detection signals from the water temperature sensor 22, throttle opening sensor 25, vehicle speed sensor 26, and shift position sensor 27.

Meanwhile, the T-ECU 15 outputs control signals indicating the operating state to be established, and control signals indicating the gear stage to be connected in the forward shift speeds to the hydraulic control portion 19 of the automatic transmission 11. In the embodiment, the T-ECU 15 serves to set the gear stage and the shift range upon change in the shift mode.

The T-ECU 15 changes the operation state of the gear portion 18 by controlling the hydraulic control 19 of the automatic transmission 11 on the basis of the shift position SP detected by the shift position sensor 27.

More specifically, the T-ECU 15 brings the gear portion 18 into the parking state when the shift position SP is detected as being in the position P. Likewise, it brings the gear portion 18 into the reverse position and the neutral position when the shift position SP is detected as being the positions R and N, respectively.

The T-ECU 15 selects the shift mode into the automatic shift mode when the shift position SP is in the position D, and selects the gear stage among the 1st to 5th speeds at which it is expected to provide appropriate fuel efficiency and power in accordance with the vehicle operating state. Accordingly, the gear stage is automatically changed to the selected speed.

According to the embodiment, the vehicle operating state (engine load, torque required by the vehicle operator and the like) is determined on the basis of the vehicle speed V and the throttle opening TH under the generally employed automatic shift control so as to select the gear stage that has been preliminarily set in accordance with the vehicle operating state. In the embodiment, the vehicle speed V and the throttle valve opening TH constitute the first vehicle operating information.

When the shift position SP is in the position 2, the T-ECU 15 does not perform upshifting from the 2nd to the higher speed. The T-ECU 15 conducts automatic transmission control as in the automatic shift mode in the shift range having the 2nd speed as the highest gear stage in accordance with the vehicle operating state as shown in FIG. 5.

Figures 6, 7:
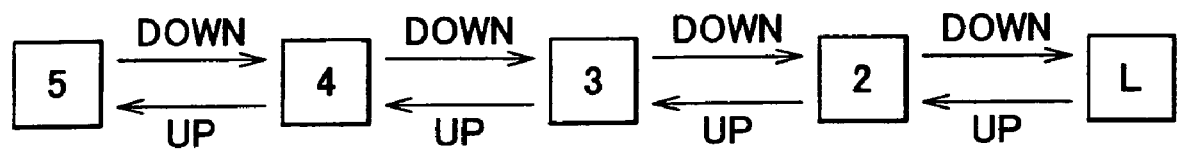
FIG. 6 is a schematic view showing the state where the shift range is selected in the position M.
FIG. 7 is a table representing gear speeds that can be selected in the respective shift ranges.

When the shift position SP is in the position L, the T-ECU 15 holds the gear stage in the 1st speed. Meanwhile, when the shift position SP is in the position M, the manual shift mode is set, and the shift range is changed on the basis of the upshifting SU by the upshift switch 13 or the downshifting operation SD by the downshift switch 14. The shift range includes 5 ranges, that is, ranges 5, 4, 3, 2 and L. Referring to FIG. 7, the range 5 allows selection of the gear stage among 1st to 5th speeds. Each of the ranges 4, 3, 2 allows selection of the gear stage among 1st to 4th speeds, 1st to 3rd speeds, and 1st to 2nd speeds, respectively. In the range L, the 1st speed is only available. The T-ECU 15 conducts the shift control of range holding type in the manual shift mode. In the embodiment, the upshifting SU and the downshifting SD are manually conducted.

When the upshifting SU is performed in the manual shift mode, the T-ECU 15 changes the currently set shift range to the shift range having the highest gear which is one stage hither than the highest gear in the current shift range. Referring to FIG. 6, for example, if the shift range is currently set in L, the shift range is changed to the range 2. Likewise, if the shift range is currently set in the range 2, the shift range is changed to the range 3. If the shift range is currently set in the range 3, the shift range is changed to the range 4. If the shift range is currently set in the range 4, the shift range is changed to the range 5.

When the downshifting SD is performed, the T-ECU 15 changes the currently set shift range to the shift range having the highest gear as being one stage lower than the highest gear in the currently set shift range. That is, as shown in FIG. 6, if the shift range is currently set in the range 5, the shift range is changed to the range 4. Likewise, if the shift range is currently set in the range 4, the shift range is changed to the range 3. If the shift range is currently set in the range 3, the shift range is changed to the range 2. If the shift range is currently set in the range 2, the shift range is changed to the range L.

In the currently set shift range in the manual shift mode, the T-ECU 15 conducts the same automatic shift control as those conducted in the position D in the automatic shift mode. If the shift range 5 is currently set, the gear stage is selected among the 1st to the 5th speeds in accordance with the throttle opening TH and the vehicle speed V as shown in the table of FIG. 7. If the shift range 4 is currently set, the gear stage is selected among the 1st to the 4th speeds. If the shift range 3 is currently set, the gear stage is selected among the 1st to the 3rd speeds. If the shift range 2 is currently set, the gear stage is selected between the 1st and 2nd speeds. If the shift range L is currently set, the gear stage is held in the 1st stage irrespective of the throttle opening TH and the vehicle speed V. When the automatic shift control is conducted in the ranges L, 2, 3, and 4 at the manual shift mode, the upshifting operation from the highest gear stage in the currently set shift range is stopped unlike the automatic shift control at the automatic shift mode.

(Control for Setting First Shift Range)

Upon selection of the shift position SP from the position D to M, the T-ECU 15 performs the control for setting the first shift range where the shift range after setting the shift position is selected among 5 shift ranges on the basis of the vehicle speed V. In this embodiment, the vehicle speed V constitutes the second vehicle operation information.

The control for setting the first shift range will be described referring to the flowchart of FIG. 1. In step (hereinafter referred to as S) 100, it is determined whether the shift position SP is set in the position M. If YES is obtained in S100, that is, the shift position SP is set in the position M, the shift mode is held in the manual mode, thus keeping the manual shift control.

If NO is obtained in S100, that is, the shift position SP is set in the position D, the process proceeds to S101 where the shift mode is changed from manual to automatic mode, thus, executing the automatic shift control and the process proceeds to S102. In the automatic shift mode, in S102, it is determined whether the vehicle speed V is smaller than a predetermined first vehicle speed reference value SPDCHK1. If YES is obtained in S102, that is, the vehicle speed V is smaller than the SPDCHK1, the process proceeds to step S103 where the 3 range flag sftch3RG is set to 1, and the 4 range flag sftch4RG and the 5 range flag sftch5RG are set to 0, respectively. The first vehicle speed reference value SPDCHK1 represents the value based on which it is determined whether the currently detected vehicle speed V allows selection of one of the 3rd and 4th speeds under the automatic shift control in the automatic shift mode. The 3 range flag sftch3RG, 4 range flag sftch4RG, and 5 range flag sftch5RG are used for setting the shift ranges 3, 4, and 5, respectively.

If the vehicle speed V is equal to or higher than the first vehicle speed reference value SPDCHK1 in S103, the process proceeds to S104 where it is determined whether the vehicle speed V is smaller than a second vehicle speed reference value SPDCHK2 that is larger than the first vehicle speed reference value SPDCHK1. If YES is obtained in S104, that is, the vehicle speed is lower than the SPDCHK2, the process proceeds to S105 where the 4 range flag sftch4RG is set to 1, and the 3 range flag sftch3RG, and the 5 range flag sftch3RG are set to 0, respectively. The second vehicle speed reference value SPDCHK2 represents the value based on which it is determined whether the currently detected vehicle speed V allows selection of one of the 4th and the 5th speeds under the automatic shift control in the automatic shift mode.

If NO is obtained in S104, that is, the vehicle speed V is equal to or higher than the SPDCHK2, the process proceeds to S106 where the 5 range flag sftch5RG is set to 1, and the 3 range flag sftch3RG, 4 range flag sftch4RG are set to 0, respectively.

After executing S103, S105, and S106, the process proceeds to S107 where it is determined whether the shift position SP has been changed from the position D to M. If NO is obtained in S107, that is, the shift position SP is held in the position D, the process returns to S101.

If YES is obtained in S107, that is, the shift position SP has been changed to the position M, the process proceeds to S108 where it is determined whether the 3 range flag sftch3RG is set to 1. If YES is obtained in S108, that is, the sftch3RG is equal to 1, the process proceeds to S109 where the shift range is changed to the range 3, and the 3 range flag sftch3RG is set to 0. The routine, then, ends.

If NO is obtained in S108, that is, the 3 range flag sftch3RG is not equal to 1, the process proceeds to S110 where it is determined whether the 4 range flag sftch4RG is equal to 1. If YES is obtained in S110, that is, the sftch4RG is equal to 1, the process proceeds to S110 where the shift range is changed to the range 4, and the 4 range flag sftch4RG is set to 0. The routine, then ends.

If NO is obtained in S110, that is, the 4 range flag sftch4RG is not equal to 1, the process proceeds to S112 where the shift range is changed to the range 5, and the 5 range flag sftch5RG is set to 0. The routine, then ends.

(Operation)

The operation of the embodiment as structured above will be described.

When the vehicle operator sets the shift position SP to the position D where the 3rd speed is established under the automatic shift control, that is, the accelerator pedal is released during running at the vehicle speed V as a constant speed, which is lower than the first vehicle speed reference value SPDCHK1, the throttle opening TH is fully closed. Accordingly, the upshifting from the 3rd to the 5th speed is performed.

If the vehicle operator intends to perform downshifting for the purpose of obtaining the engine braking force higher than that obtained in the 5th speed, the shift position SP is changed from the position D to M. Then the shift range in the position M becomes the range 3 such that the gear stage is changed from the 5th to the 3rd speed.

In the aforementioned state, when the vehicle operator performs downshifting SD once, the shift range is changed from the range 3 to 2 such that the gear stage is changed from the 3rd to the 2nd speed. This makes it possible to provide the engine braking force higher than that obtained in the one stage lower gear, that is, 2nd speed during running at the constant speed in the state where the 3rd speed is selected under the automatic shift control.

When the vehicle operator sets the shift position SP to the position D, and the 5th speed is selected in the automatic shift mode, that is, the accelerator pedal is released during running at the high vehicle speed V which is equal to or higher than the second vehicle speed reference value SPDCHK2, the 5th speed is maintained.

If the vehicle operator intends to perform downshifting for the purpose of obtaining the acceleration torque or the engine braking force higher than that obtained in the 5th speed, the shift position SP is changed from the position D to M. Then the shift range in the position M becomes the range 5 such that the gear stage is kept in the 5th speed.

In the aforementioned state, when the vehicle operator performs downshifting SD once, the shift range is changed from the range 5 to 4 such that the gear stage is changed from the 5th to the 4th speed. This makes it possible to provide the acceleration torque or the engine braking force during running at high speeds in the 5th speed under the automatic shift control, which is higher than that obtained in one stage lower speed, that is, the 4th speed.

Accordingly only a single downshifting after change in the mode from the automatic shift mode to the manual shift mode allows the gear stage set at the automatic shift mode to be shifted down to the stage as being one stage lower.

(Effect)

Effects obtained from the embodiment will be described.

(1) In the automatic shift mode where the shift position SP is set to the position D, the T-ECU 15 selects the gear stage among 5 speeds so as to be set in the automatic transmission 11 on the basis of the throttle opening TH and the vehicle speed V detected at that time (first vehicle information).

Upon change in the shift position SP from the position D to M, the T-ECU 15 sets the shift range selected in accordance with the vehicle speed V detected at that time (second vehicle information) in the automatic transmission 11.

Since the gear stage set in the manual shift mode is different from the gear stage set in the automatic shift mode, the vehicle operator is allowed to downshift to the gear at which the engine braking force higher than the desired force while reducing the frequency of downshifting operations at the manual shift mode.

In the shift control apparatus for the vehicular automatic transmission disclosed in JP-A-6-221417, when the vehicle operator releases the accelerator pedal in order to decelerate from the running state of acceleration in the 3rd speed at the automatic shift mode, the shift control apparatus automatically performs upshifting from the 3rd to the 5th speed. When the vehicle operator changes the shift range from the range D to B for further deceleration, the gear is shifted from the 5th to the 4th speed. The engine braking force desired by the vehicle operator is obtained in the 2nd speed that is one stage lower than the 3rd speed. Therefore, downshifting has to be performed twice in the range B.

In this embodiment, on the contrary, the downshifting SD is required only once after changing the shift mode to the manual mode.

(2) In the manual shift mode, the T-ECU 15 selects the appropriate gear in the shift range set upon selection from the automatic shift mode to the manual shift mode in accordance with the throttle opening TH and the vehicle speed V (first vehicle operation information), and sets the selected gear in the automatic transmission 11.

The T-ECU 15 changes the currently set shift range to the one having the highest gear that is one stage higher than that in the currently set shift range by the upshifting SU at the manual shift mode. Likewise the T-ECU 15 changes the currently set shift range to the one having the highest gear that is one stage lower than that in the currently set shift range by the downshifting SD.

Therefore, during running at the manual shift mode, the gear stage is automatically downshifted in accordance with the vehicle operation state. If the vehicle is decelerated without applying further higher engine braking force by downshifting, the downshifting is automatically performed. This makes it possible to eliminate the need of performing the downshifting, thus simplifying the operation.

(3) When the vehicle operator changes the shift mode from the automatic mode to the manual mode, the T-ECU 15 selects the gear in accordance with the vehicle speed V (second vehicle operation information) and sets the selected gear in the automatic transmission 11.

If the automatic shift mode is changed to the manual shift mode during running at the automatic shift mode in the state where the upshifting from the currently set gear is performed by the vehicle operator who releases the accelerator pedal, the gear established after the change in the shift mode corresponds to the one which has been set based on the throttle opening TH and the vehicle speed under the automatic shift control before the release of the accelerator pedal.

The appropriate gear in accordance with the vehicle speed V upon change in the shift mode to the manual mode can be established irrespective of the release state of the accelerator pedal in the automatic shift mode. Only a single operation of the downshifting at the automatic shift mode makes it possible to change the gear to the stage at which the engine braking force or the acceleration torque that is higher than that desired by the vehicle operator is obtained.

Second Embodiment

Figure 8:
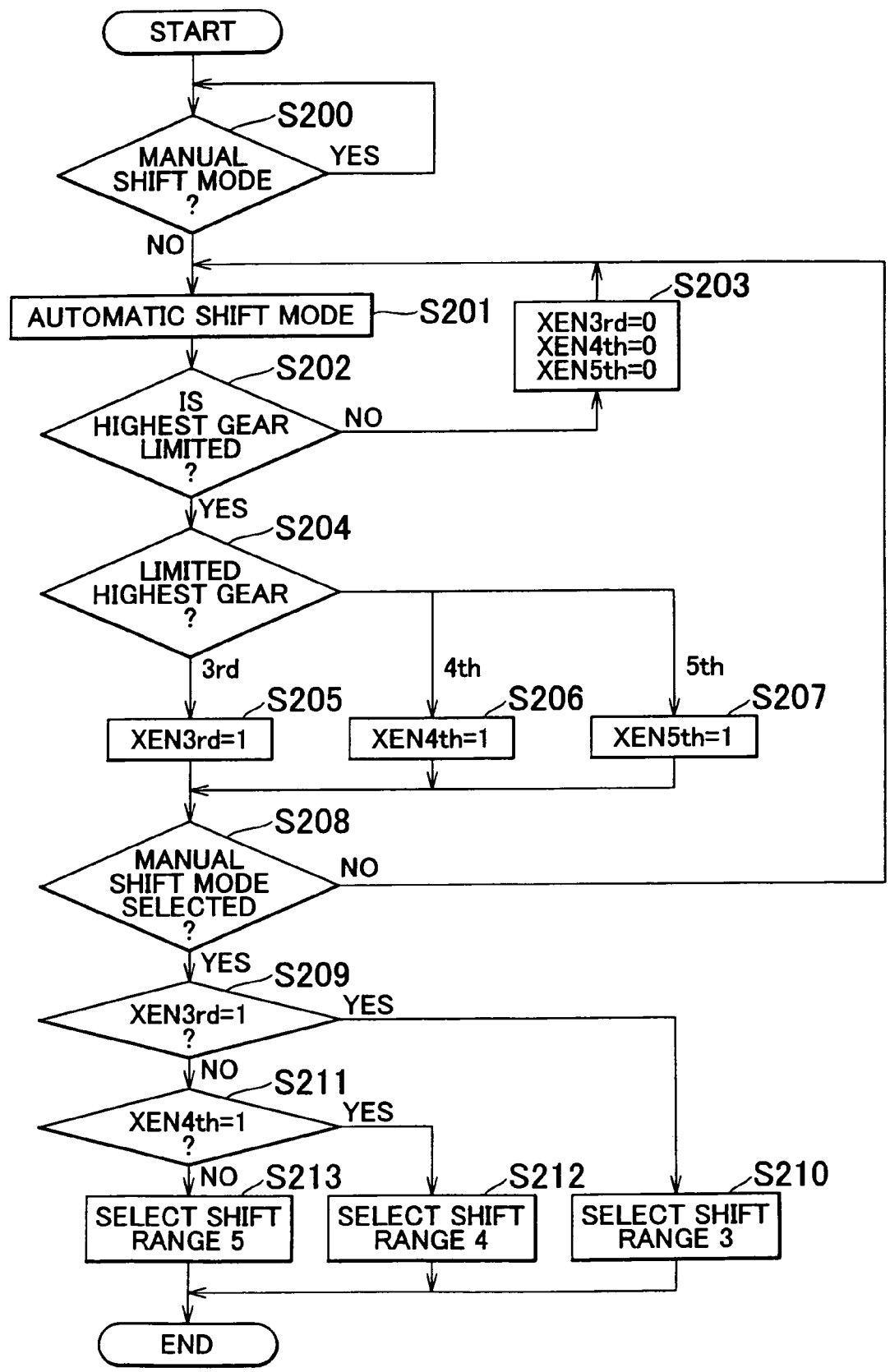
FIG. 8 is a flowchart representing a control routine for setting a second shift range in a second embodiment.

A second embodiment of the invention will be described referring to FIG. 8. The second embodiment is different from the first embodiment in three points as described below.

In the second embodiment, the automatic transmission includes 6 speeds.

The uphill/downhill control is conducted in the automatic shift mode.

The second shift range set control is conducted in place of the first shift range set control.

The elements constituting the structure, which are identical to those in the first embodiment will be designated with the same reference numerals, and each explanation of those elements, thus, will be omitted. The explanation of the aforementioned three different points are explained hereinafter.

In the second embodiment, the T-ECU 15 serves to set the gear stage upon manual shifting, set the shift range upon manual shift mode, and restrict shifting in the automatic shift mode. In the automatic shift mode where the shift position is set in the position D, the T-ECU 15 selects the appropriate gear among the $1^{st}$ to $6^{th}$ speeds so as to obtain the fuel efficiency and power in accordance with the vehicle operation state. The T-ECU 15 then sets the selected gear to be established for conducting automatic shift control. Like the first embodiment, the gear is selected on the basis of the first vehicle operation information containing the vehicle speed V and the throttle opening TH.

When the shift position SP is in the position M, the shift mode is changed to the manual shift mode. In the aforementioned state, the T-ECU 15 changes the shift range to be set in accordance with the upshifting SU or downshifting SD. In this embodiment, 6 shift ranges are provided by adding one shift range to the 5 shift ranges in the first embodiment. The shift range 6 includes the 1st to 6th speeds. Upon selection of the shift mode to the manual mode, if the shift range 5 has been set, the T-ECU 15 performs upshifting so as to change the shift range from the range 5 to 6. If the shift range 6 has been set, the T-ECU 15 performs downshifting so as to change the shift range from the range 6 to 5. If the shift range 6 has been set in the manual shift mode, the T-ECU 15 selects the appropriate gear among the 1st to 6th speeds and sets the selected gear in the automatic transmission 11 in accordance with the vehicle operation state.

(Uphill/Downhill Running Control)

When the vehicle is running on the uphill/downhill at the automatic shift mode, the T-ECU 15 conducts the uphill/downhill running control such that the highest gear to be set is kept lower stage in accordance with the slope resistance.

The uphill/downhill running control is a generally employed technology. In this embodiment, the slope resistance caused by running on the uphill/downhill is detected on the basis of the throttle opening TH and the vehicle acceleration derived from the vehicle speed V. The slope resistance caused by the running on the uphill/downhill constitutes the third vehicle operation information.

More specifically, when the detected value (positive) of the slope resistance during running on the uphill becomes equal to or greater than a predetermined first slope reference value, the highest gear stage is set to the 5th speed. Then upshifting from the 5th to 6th speed is interrupted, and downshifting from the 6th to 5th speed is performed. When the detected value becomes equal to or greater than a second slope reference value that is larger than the first slope reference value, the highest gear is set to the 4th speed. Then upshifting from the 4th to the 5th speed is interrupted and downshifting from the 5th or 6th to 4th speed is performed. When the detected value becomes equal to or greater than a third slope reference value that is larger than the second slope reference value, the highest gear is set to the 3rd speed. Then upshifting from the 3rd to 4th speed is interrupted and downshifting from the 4th, 5th, or 6th to 3rd speed is performed.

When the detected value (negative) of the slope resistance during running on the downhill becomes equal to or greater than a predetermined fourth slope reference value, the highest gear is set to the 5th speed. The upshifting from the 5th to 6th speed is interrupted, and downshifting from the 6th to 5th is performed. When the detected value becomes equal to or greater than a fifth slope reference value that is larger than the fourth slope reference value, the highest gear is set to the 4th speed. Then upshifting from the 4th to 5th speed is interrupted, and downshifting from the 5th or 6th to 4th speed is performed. When the detected value becomes equal to or greater than a sixth slope reference value larger than the fifth slope reference value, the highest gear is set to the 3rd speed. Then upshifting from the 3rd to 4th speed is interrupted, and downshifting from the 4th, 5th or 6th to 3rd speed is performed.

Upon change in the shift position SP from the position D to M under the uphill/downhill running control at the automatic shift mode, the T-ECU 15 executes a second shift range set control for setting the shift range having the highest gear stage that is limited to the lower speed under the uphill/downhill running control.

In the second embodiment of the invention, the highest gear stage to be limited under the uphill/downhill running control constitutes the second vehicle operation information.

(Second Shift Range Set Control)

The control routine for the second shift range set control will be described referring to a flowchart of FIG. 8. In S200, it is determined whether the shift position SP is in the position M. If YES is obtained in S200, that is, the shift position SP is in the position M, the shift mode is held at the manual shift mode where the manual shift control is continued. If NO is obtained in S200, that is, the shift position SP is in the position D, the process proceeds to S201 where the shift mode is changed from the manual to the automatic mode where the automatic shift control is executed.

Under the automatic shift control, it is determined in S202 whether the highest gear speed is limited under the uphill/downhill running control. If NO is obtained in S202, that is, the highest gear speed is not limited, the process proceeds to S203. In S203, the 3rd speed flag XEN3rd, 4th speed flag XEN4th, and 5th speed flag XEN5th are all set to 0, and the automatic shift control is continued. The 3rd speed flag XEN3rd, 4th speed flag XEN4th, and 5th speed flag XEN5th are used for setting the shift ranges 3, 4, and 5, respectively.

If YES is obtained in S202, that is, the highest gear speed is limited, the process proceeds to S204 where it is determined as to which gear stage, the 3rd, 4th or 5th speed, corresponds to the highest stage in the currently set shift range.

If it is determined that the 3rd speed corresponds to the highest gear stage in S204, the process proceeds to S205 where the 3rd flag XEN3rd is set to 1. If it is determined that the 4th speed corresponds to the highest gear stage in S204, the process proceeds to S206 where the 4th flag XEN4th is set to 1. Likewise if it is determined that the 5th speed corresponds to the highest gear stage in S204, the process proceeds to S207 where the 5th flag XEN5th is set to 1.

After execution of S205, S206 or S207, the process proceeds to S208 where it is determined whether the shift position SP is changed from the position D to M. If NO is obtained in S208, that is, the shift position SP is held in the position D, the routine returns to S201.

Meanwhile, if YES is obtained in S208, that is, the shift position SP is changed from the position D to M, the process proceeds to S209 where it is determined whether the 3rd flag XEN3rd is equal to 1. If YES is obtained in S209, that is, the 3rd flag XEN3rd is equal to 1, the process further proceeds to S210 where the shift range is changed to the range 3, and the routine, then ends.

If NO is obtained in S209, that is, the 3rd flag XEN3rd is not equal to 1, the process proceeds to S211 where it is determined whether the 4th flag XEN4th is equal to 1. If YES is obtained in S211, that is, the 4th flag XEN4th is equal to 1, the process proceeds to S212 where the shift range is changed to the range 4, and the routine ends.

If NO is obtained in S211, that is, the 4th flag XEN4th is not equal to 1, the process proceeds to S213 where the shift range is changed to the range 5.

(Operation)

The operation of the above-structured embodiment will be described hereinafter.

When the vehicle is running on the uphill in the state where the shift position is set to the position D, and the running state of the vehicle on the gentle uphill shows the slope resistance equal to or larger than the first slope resistance value, and smaller than the second slope resistance value, the highest gear is limited to the 5th speed under the uphill running control.

In the case where the vehicle operator intends to perform downshifting to obtain the uphill running torque higher than that obtained in the 5th speed, the shift position is changed from the position D to M. Then the second shift range set control is executed such that the shift range 5 in the position M is established, thus maintaining the gear stage in the 5th speed.

When the vehicle operator performs downshifting only once in the aforementioned case, the shift range 5 is changed to the shift range 4, and the gear stage is shifted from the 5th to 4th speed. As a result, during running on the gentle uphill under the uphill running control where the 5th speed is set as the highest gear in the shift range, the uphill running torque that is higher than the torque derived from the 4th speed as being one stage lower can be obtained.

In the medium uphill running at the automatic shift mode showing the slope resistance equal to or larger than the second slope resistance reference value, and smaller than the third slope resistance reference value, the uphill running control limits the highest gear in the shift range to the 4th speed.

When the vehicle operator intends to perform downshifting to obtain the uphill running torque higher than the torque obtained in the 4th speed, the shift position SP is changed from the position D to M. Then the second shift range set control starts to set the shift range to the range 4 at the shift position M. The gear stage is, thus, held in the 4th speed.

If the vehicle operator performs downshifting only once, the shift range is changed from the range 4 to 3, and the gear stage is shifted from the 4th to the 3rd speed. As a result, during running on the medium uphill having the 4th speed set as the highest gear stage under the uphill running control, the uphill torque that is higher than the torque derived from the 3rd speed as being one stage lower can be obtained.

In the running on the sharp uphill at the automatic shift mode, when the slope resistance is equal to or larger than the third slope resistance reference value, the uphill running control limits the highest gear in the shift range to the 3rd speed.

When the vehicle operator intends to perform downshifting to obtain the uphill running torque higher than the torque derived from the 3rd speed, the shift position SP is changed from the position D to M.

Then the second shift range set control starts to set the shift range to the range 3 in the position M. The gear stage is, thus, held in the 3rd speed. If the vehicle operator performs downshifting only once in the aforementioned state, the shift range is changed from the range 3 to 2, and the gear stage is shifted from the 3rd to 2nd speed.

As a result, during running on the sharp uphill where the 3rd speed is set as the highest gear stage under the uphill running control, the uphill torque that is higher than the torque derived from the 2nd speed as being one stage lower can be obtained. As a result, a single downshifting operation after changing the shift mode from the automatic to manual mode makes it possible to perform downshifting from the gear stage set at the automatic shift mode to the gear that is one stage lower.

During running downhill, like running uphill as described above, single downshifting operation of the vehicle operator makes it possible to perform downshifting to the gear as being one stage lower. Accordingly, the engine braking force higher than the one derived from the gear stage one stage lower can be obtained.

(Effect)

The effect of the embodiment will be described hereinafter.

(4) When the vehicle operator changes the shift mode from the automatic to the manual mode, the T-ECU 15 sets the shift range having the highest gear stage corresponding to the highest gear stage limited under the uphill/downhill running control (third vehicle operation information).

Accordingly even if the highest gear set under the uphill/downhill running control at the automatic shift mode is different from that at the manual shift mode, the highest gear limited under the uphill/downhill running control can be set upon change in the shift mode to the manual mode.

Therefore, a single downshifting SD after changing the shift mode to the manual mode makes it possible to change the gear to the stage by which the uphill running torque higher than that intended by the vehicle operator may be obtained.

Third Embodiment

Figure 12:
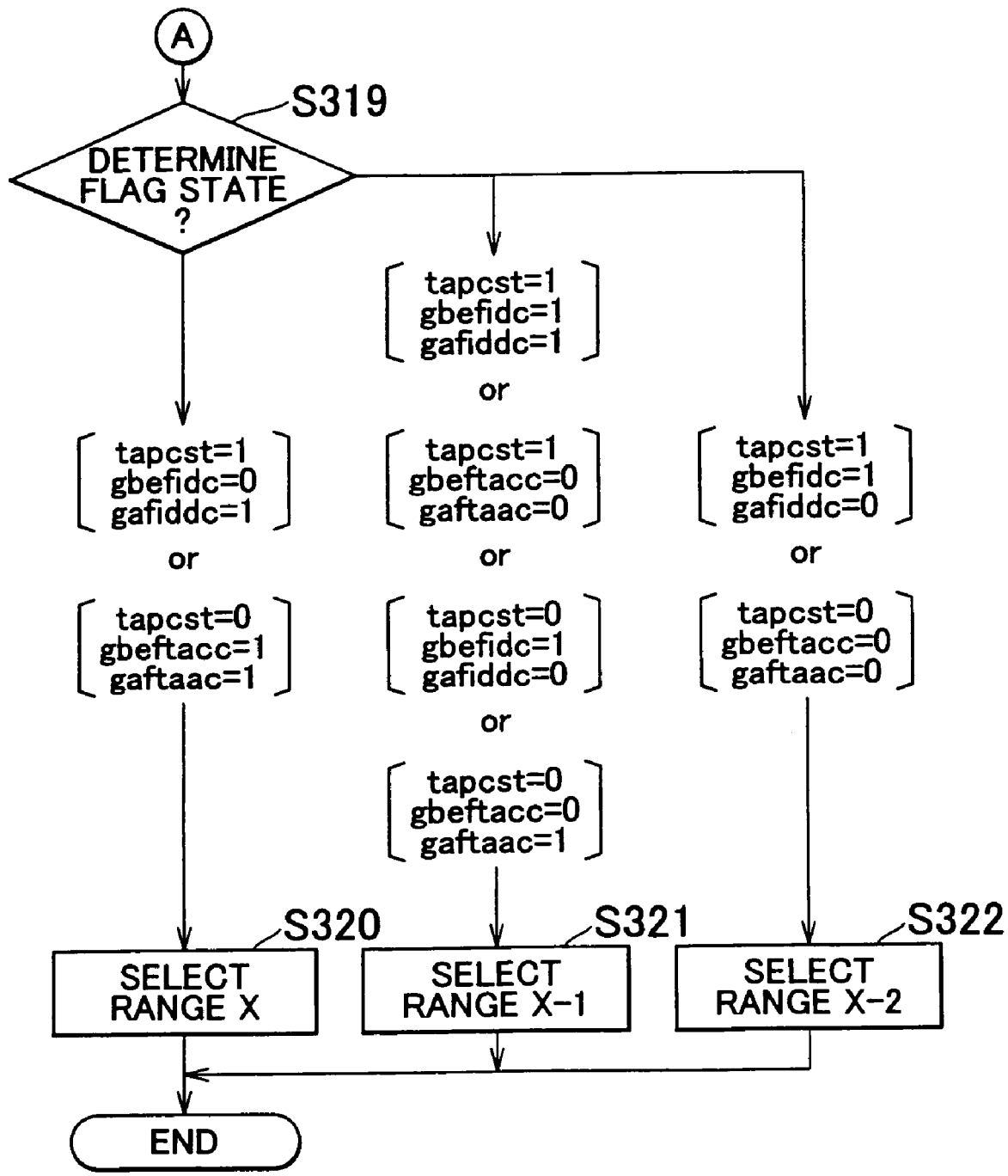
FIG. 12 is a flowchart representing a control routine for setting the third shift range.

The third embodiment of the invention will be described referring to FIGS. 9, 10, and 12 will be described hereinafter. This embodiment is different from the first embodiment in the points as described below.

In the embodiment, an engine speed sensor 30, an intake air quantity sensor 31, and an accelerator opening sensor 33 are provided.

The T-ECU 15 executes a third shift range set control in the manual shift mode.

The elements constituting the structure, which are identical to those in the first embodiment will be designated with the same reference numerals, and each explanation of those elements, therefore, will be omitted. The explanation of the aforementioned two different points will be explained hereinafter.

Figure 9:
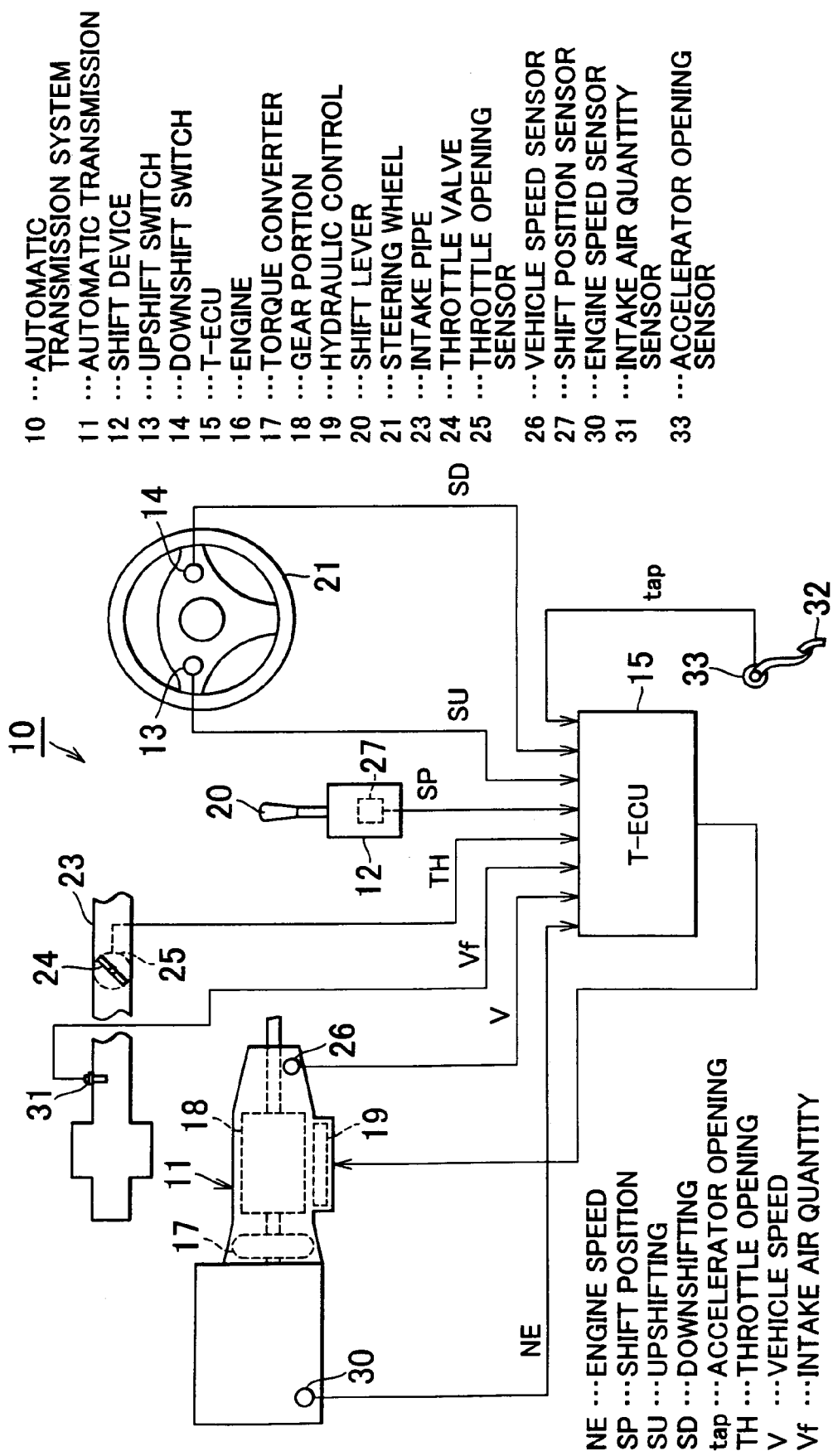
FIG. 9 is a block diagram of an automatic transmission system in a third embodiment.

Referring to FIG. 9, the engine 16 is provided with the engine speed sensor 30 for detecting an engine speed NE. The intake air quantity sensor 31 for detecting intake air quantity Vf for air combustion is provided in an inlet of an intake pipe 23.

An accelerator opening sensor 33 for detecting an accelerator opening tap is provided on an accelerator pedal 32. In this embodiment, the T-ECU 15 serves to set the gear stage and the shift range upon manual shifting.

The T-ECU 15 obtains the engine speed NE from the detection signal output from the engine speed sensor 30. The T-ECU 15 further obtains the intake air quantity Vf and the accelerator opening tap from the detection signals output from the intake air quantity sensor 31 and the accelerator opening sensor 33, respectively.

The T-ECU 15 obtains a current vehicle acceleration gbef of the vehicle from the vehicle speed V obtained at sufficiently short time intervals. The T-ECU 15 further obtains the engine torque from the engine speed NE and the intake air quantity Vf.

The T-ECU 15 estimates the acceleration gaf after shifting based on the gear ratio to be set in the shift range having the highest gear as being one stage or two stages lower than the highest gear in the shift range set in accordance with the detected engine torque, and vehicle speed V at the manual shift mode, or the transmission ratio of the power transmission system.

In the embodiment, the T-ECU 15 executes the third shift range set control for setting the shift range at which the downshifting SD is performed at the manual shift mode on the basis of the accelerator opening tap, the vehicle acceleration gbef, and the acceleration after shifting gaf.

In this embodiment, the fourth vehicle operation information is obtained from the accelerator opening tap, the vehicle acceleration gbef, and the vehicle acceleration gbef. Under the third shift range set control, the T-ECU 15 determines whether the vehicle operator intends to accelerate the vehicle on the basis of the accelerator opening tap. It is further determined whether the vehicle is currently in the accelerated state, the normal running state, or the decelerated state from the vehicle acceleration gbef corresponding to the accelerator opening tap. The T-ECU 15 estimates as to which state the vehicle is brought into after shifting, the accelerated state, the normal running state or the decelerated state on the basis of the acceleration after shifting gaf corresponding to the accelerator opening tap. In accordance with the aforementioned determinations, the shift range to be set upon downshifting SD is set.

(Third Shift Range Set Control)

The routine of the third shift range set control will be described referring to flowcharts of FIGS. 10 to 12.

In S300, it is determined whether the shift mode is in the manual mode on the basis of the shift position SP. If NO is obtained in S300, that is, the shift mode is not at the manual mode, the control routine is not executed. If YES is obtained in S300, that is, the shift mode is at the manual mode, the process proceeds to S301 where it is determined whether the accelerator opening tap is smaller than a predetermined accelerator opening reference value tap 1. The accelerator opening reference value tap 1 is set such that it is determined whether the accelerator pedal 32 is depressed by the vehicle operator for the purpose of accelerating the vehicle. In S301, it is determined whether the accelerator pedal 32 is depressed by the vehicle operator who intends to accelerate the vehicle.

(No Intention of Acceleration)

If YES is obtained in S301, that is, the accelerator opening tap is smaller than the accelerator opening reference value tap 1, the process proceeds to S302 where a non-acceleration flag tapcst is set to 1.

Then in S303, it is determined whether the vehicle acceleration gbef exceeds a predetermined first acceleration reference value in a non-acceleration state regg1. The first acceleration reference value regg1 is set such that it is determined whether the vehicle acceleration gbef resulting from depression of the accelerator pedal 32 by the vehicle operator with no intention of acceleration is relatively large. In S303, it is determined whether the vehicle acceleration gbef determined by the driving force and running resistance generated when the vehicle operator depresses the accelerator pedal 32 lightly because of no intention of accelerating is relatively large. The running resistance is obtained as the sum of the air resistance in accordance with the vehicle speed V, the slope resistance in accordance with the slope of the road, and the like.

If NO is obtained in S303, that is, the vehicle acceleration gbef is equal to or greater than the first acceleration reference value regg1, the process proceeds to S304 where the first acceleration flag in the non-accelerated state gbefidac is set to 0. The process then proceeds to S305.

In S305, it is determined whether the acceleration gaf obtained in the gear set upon change in the currently set shift range to the range (X range) having the highest gear one stage lower is smaller than a predetermined second acceleration reference value in the non-accelerated state dcafg. The second acceleration reference value dcafg is set for determining relative magnitude of the acceleration after shifting gaf obtained in the gear in the shift range having the highest gear as being one stage lower. In S305, it is determined whether the magnitude of the acceleration gaf defined by the driving force and the running resistance generated during running by the vehicle operator with no intention of acceleration is large.

The gear stage established upon change in the shift range to the range having the highest gear as being one stage lower may become one stage lower than the currently set gear stage, or the same as the currently set gear stage. In the state where the highest gear stage is set in the current shift range, shifting to the lower shift range may establish the gear stage as being one stage lower. In the state where the gear stage is set to be lower than the highest gear in the current shift range, shifting to the lower shift range may keep the currently set gear stage unchanged.

If YES is obtained in S305, that is, the acceleration gaf obtained in the gear set in the shift range having the highest gear as being one stage lower is smaller than the second acceleration reference value dcafg, the process proceeds to S306. In S306, the second acceleration flag in the non-accelerated state gafiddc is set to 1, and the process proceeds to S308. If NO is obtained in S305, the process proceeds to S307 where the second acceleration flag gafiddc is set to 0, and the process proceeds to S308.

If YES is obtained in S303, that is, the vehicle acceleration gbef exceeds the first acceleration reference value regg1, the process proceeds to S309 where the first acceleration flag in the non-accelerated state is set to 1. Then the process proceeds to S310.

In S310, it is determined whether the acceleration gaf in the gear stage established after changing the shift range to the range having the highest gear two stages lower, that is, the range X-1 is smaller than the second acceleration reference value dcafg. The second acceleration reference value in the non-accelerated state dcafg is used to determine the relative magnitude of the acceleration gaf obtained in the gear in the shift range having the highest gear as being two stages lower. Like S305, it is determined in S310, whether the acceleration gaf defined by the driving force and the running resistance is relatively large.

The gear stage established upon change in the shift range to the range having the highest gear as being two stages lower by the downshifting SD may become one stage or two stages lower than the gear which is established in the currently set shift range, or the same as the gear which is established in the currently set shift range. In the state where the highest gear stage or the stage one stage lower is established in the current shift range, shifting to the lower shift range may establish the gear stage as being two stages or one stage lower. In the state where the gear stage is set to be two or more stages lower than the highest gear in the current shift range, shifting to the lower shift range may keep the currently set gear stage unchanged.

If YES is obtained in S310, that is, the acceleration gaf obtained in the gear stage set in the shift range having the highest gear as being two stages lower is smaller than the second acceleration reference value dcafg, the process proceeds to S306. In S306, the second acceleration flag gafiddc is set to 1, and then the process proceeds to S308. If NO is obtained in S310, that is, the acceleration gaf is equal to or greater than the second acceleration reference value dcafg, the process proceeds to S307 where the range set flag in the non-accelerated state gafidde is set to 0, and further proceeds to S308.

(Intention of Vehicle Operator to Accelerate)

Figure 11:
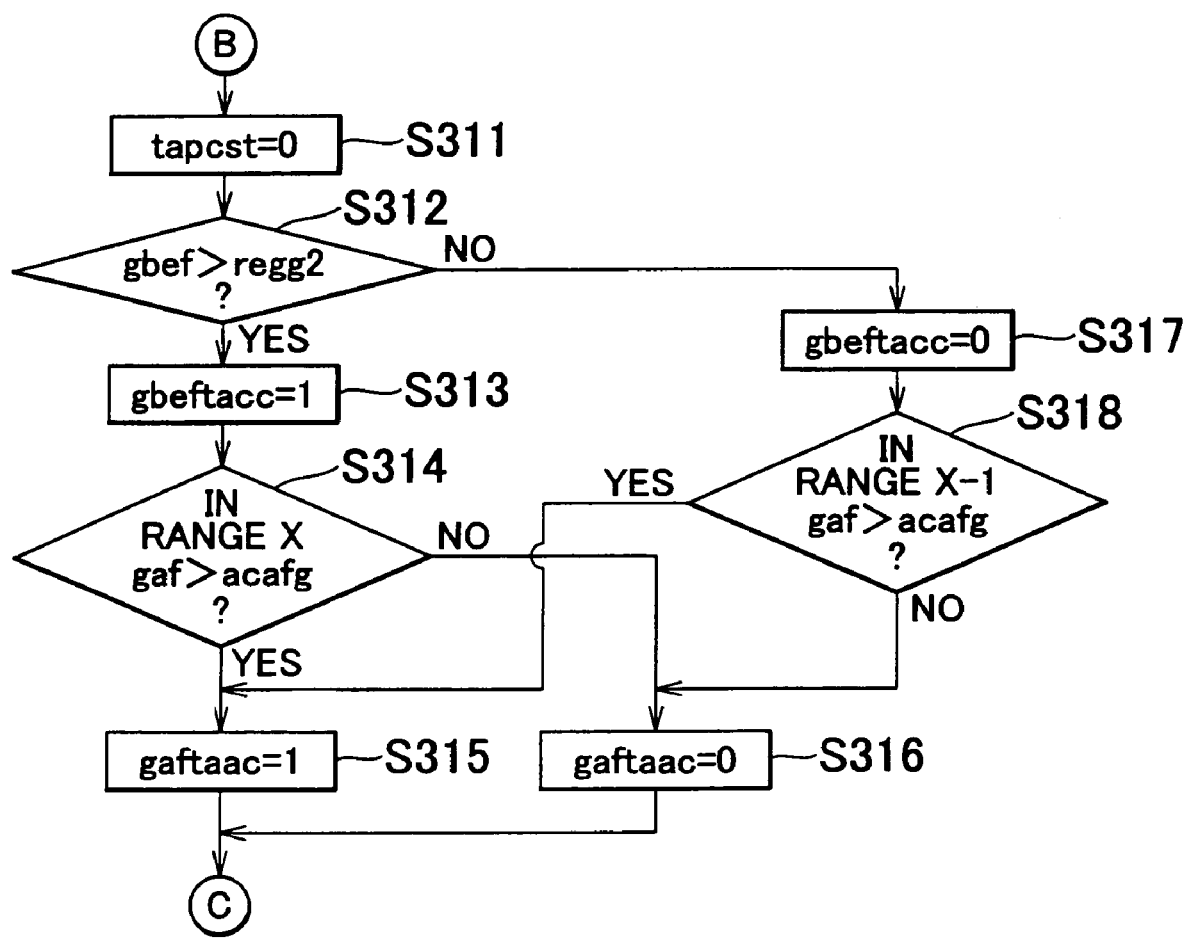
FIG. 11 is a flowchart representing a control routine for setting the third shift range.

If NO is obtained in S301, that is, the accelerator opening tap is equal to or greater than the accelerator opening reference value tap 1, the process proceeds to S311 as shown in the flowchart of FIG. 11 where the non accelerating flag tapcst is set to 0.

Then in S312, it is determined whether the vehicle acceleration gbef exceeds a predetermined first acceleration reference value upon acceleration regg2. The first acceleration reference value regg2 is set so as to determine the relative magnitude of the vehicle acceleration gbef when the vehicle operator depresses the accelerator pedal 32 with the intention of accelerating. In S312, it is determined whether the vehicle acceleration gbef defined by the driving force and the running resistance caused by depression of the accelerator pedal 32 with the intention of acceleration is relatively large.

If YES is obtained in S312, that is, the current vehicle acceleration gbef is equal to or smaller than the first acceleration reference value upon acceleration regg2, the process proceeds to S313 where the first acceleration flag gbeftaac is set to 1, and further proceeds to S314.

In S314, it is determined whether the acceleration after shifting gaf which is obtained in the gear stage set upon change in the shift range to the one having the highest gear as being one stage lower, that is, the range X becomes smaller than a predetermined second acceleration reference value upon acceleration acafg. The second acceleration reference value acafg is set such that it is determined whether the acceleration after shifting gaf, which is obtained in the gear stage set in the shift range having the highest gear as being one stage lower is relatively large. That is, in S314, it is determined whether the acceleration gaf which is defined by the driving force and the running resistance is relatively large when the vehicle operator has no intention to accelerate.

If YES is obtained in S314, that is, the acceleration gaf obtained in the gear stage set in the shift range having the highest gear as being one stage lower is larger than the second accelerator reference value upon acceleration acafg, the process proceeds to S315. In S315, the second acceleration flag gaftaac is set to 1, and the process further proceeds to S308. If NO is obtained in S314, that is, the acceleration gaf is equal to or smaller than the second accelerator reference value upon shifting acafg, the process proceeds to S316 where the second acceleration flag gaftaac is set to 0, and further proceeds to S308.

If NO is obtained in S312, that is, the vehicle acceleration gbef is equal to or smaller than the regg2, the process proceeds to S317 where the first acceleration flag upon acceleration gbeftaac is set to 0. The process then proceeds to S318.

In S318, it is determined whether the acceleration after shifting gaf set upon the change from the currently set shift change to the range X-1 having the highest gear as being two stages lower is smaller than the second reference value upon acceleration acafg. The reference value acafg is set such that it is determined whether the acceleration after shifting gaf obtained in the gear stage set in the shift range having the highest gear as being two stages lower is relatively large. Like S314, it is determined in S318 whether the acceleration after shifting gaf defined by the driving force and the running resistance is relatively large when the vehicle operator has the intention to accelerate.

If YES is obtained in S318, that is, the value gaf is greater than the reference value acafg, the process proceeds to S315 where the second acceleration flag gaftaac is set to 1. The process then proceeds to S318.

Figure 10:
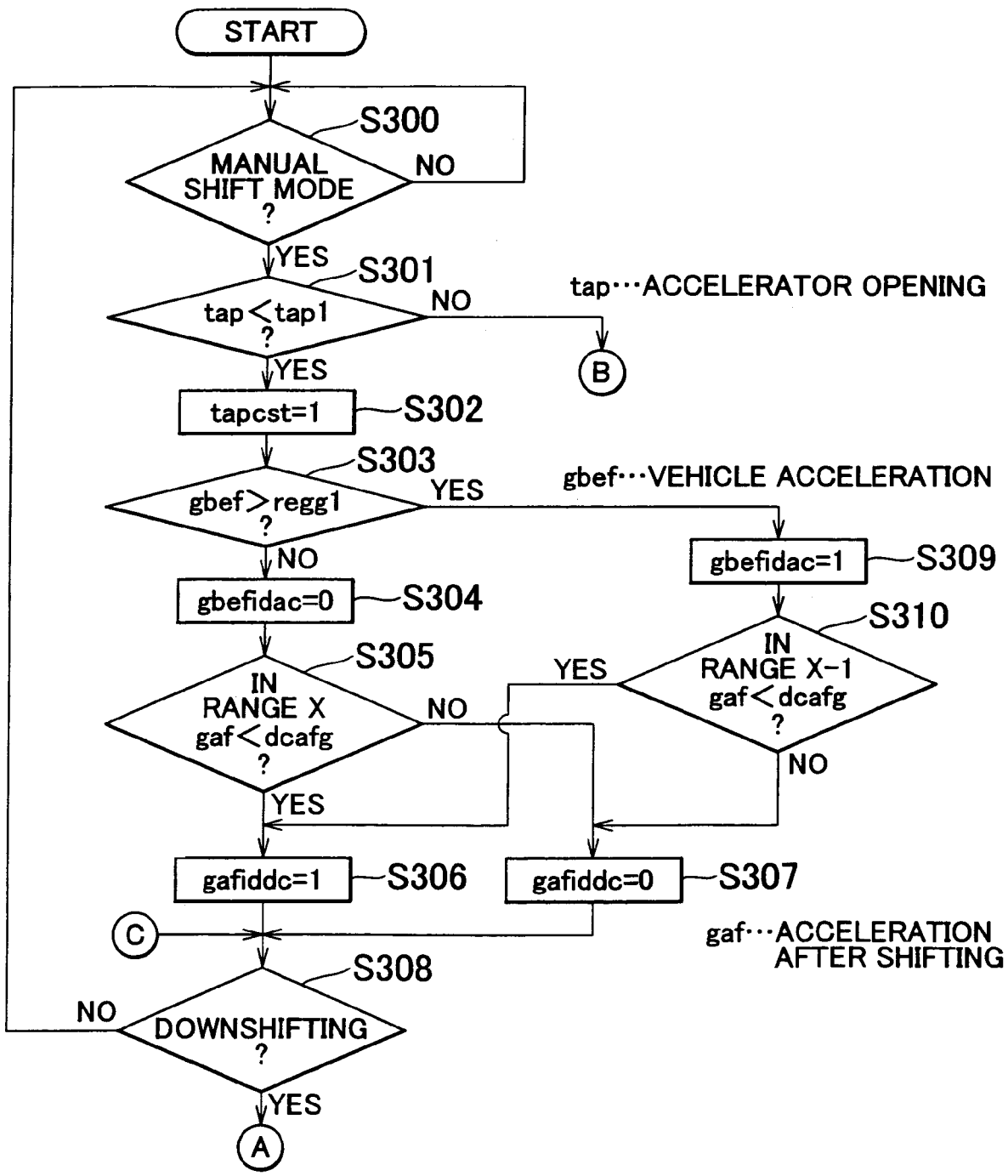
FIG. 10 is a flowchart representing a control routine for setting a third shift range.

Referring to the flowchart of FIG. 10, in S308, it is determined whether the downshifting SD has been performed. If NO is obtained in S308, that is, the downshifting SD has not been performed, the process returns to S300 from where the routine is repeatedly executed. Meanwhile, if YES is obtained in S308, that is, the downshifting SD has been performed, the process proceeds to S319 as shown in the flowchart of FIG. 12. In S319, each state of the non-acceleration state flag tapcst, non-acceleration first acceleration flag gbefidac, second acceleration flag in non-acceleration state gafiddc, first acceleration flag in the acceleration state gbeftaac, and the second acceleration flag in acceleration state gaftaac is determined, respectively.

In the state where the non-acceleration state flag tapcst is set to 1 and the non-acceleration first acceleration flag gbefidac is set to 0, when the second acceleration flag in non-acceleration state gafiddc is set to 1, the process proceeds to S320 where the current shift range is changed to the shift range X-1 having the highest gear as being two stages lower.

In the state where the flag tapcst is set to 1, and the flag gbefidac is set to 1, when the flag gafiddc is set to 1, the process proceeds to S321 where the current shift range is changed to the shift range X-1 having the highest gear as being two stages lower. Likewise, when the flag gafiddc is set to 0, the process proceeds to S322 where the current shift range is changed to the shift range X-2 having the highest gear as being three stages lower.

In the state where the flag tapcst is set to 0, and the flag gbeftaac is set to 1, if the flag gaftaac is set to 1, the process proceeds to S321 where the current shift range is changed to the shift range X having the highest gear as being one stage lower. Likewise, when the flag gaftaac is set to 0, the process proceeds to S321 where the current shift range is changed to the shift range X-1 having the highest gear as being two stages lower.

In the state where the flag tapcst is set to 0, and the flag gbeftaac is set to 0, when the flag gaftaac is set to 1, the process proceeds to S321 where the current shift range is changed to the shift range X-1 having the highest gear as being two stages lower. Likewise when the flag gaftaac is set to 0, the process proceeds to S322 where the current shift range is changed to the shift range X-2 having the highest gear as being three stages lower.

(Operation)

An operation obtained from the above-structured embodiment will be explained.

(No Intention of the Vehicle Operator to Accelerate)

In the case where the vehicle is running in the shift range 5 at the manual shift mode, and the 5th speed is set by the T-ECU 15 in accordance with the current running state, when the vehicle operator releases the accelerator pedal 32 for deceleration or running at the constant speed, the accelerator opening tap becomes smaller than the accelerator operation reference value tap 1.

If the vehicle is running against the relatively large running resistance to the vehicle driving force obtained in the 5th speed, for example, running on the gentle downhill, the current vehicle acceleration gbef becomes equal to or smaller than the first acceleration reference value upon acceleration regg1. That is, upon release of the accelerator pedal 32, a certain magnitude of the engine braking force is applied to the vehicle, thus bringing the vehicle to the running state at the constant speed or the decelerating speed.

In the case where the shift range is changed to the range 4 having the highest gear as being one stage lower than the 5th speed, that is, 4th speed, and the running resistance becomes relatively large to the vehicle driving force obtained in the 4th speed that has been changed from the 5th speed accordingly, the acceleration gaf becomes smaller than the acceleration reference value dcafg. That is, downshifting to the 4th speed may bring the vehicle into the state where higher engine braking force is obtained such that the vehicle decelerates at further high deceleration ratio.

When the vehicle operator performs downshifting SD once in the aforementioned state highly intended to decelerate, the shift range is changed from the range 5 to the range 4, and the gear stage is accordingly downshifted from the 5th to 4th speed.

In the case where the vehicle runs on the gentle downhill in the 5th speed in the selected range 5 at the manual shift mode, when the vehicle operator performs downshifting SD once for the purpose of obtaining higher engine braking force, the gear stage is changed from the 5th to the 4th speed such that appropriate engine braking force is applied in accordance with the vehicle running state.

When the running resistance is relatively small with respect to the driving force obtained in the 4th speed as being one stage lower, the acceleration after shifting gaf becomes equal to or larger than the second acceleration reference value in the non-acceleration state dcafg. That is, in the aforementioned state, as the engine braking force is, not relatively high in spite of downshifting to the 4th speed, it can be estimated that the ratio of the vehicle deceleration is relatively low.

Then if the vehicle operator performs downshifting SD for the purpose of applying further higher deceleration, the shift range is changed from the range 5 to range 3, and accordingly the gear is changed from the 5th to the 3rd speed directly.

When the vehicle starts running on the relatively steep downhill in the 5th speed of the range 5 at the manual shift mode, the gear stage is changed from the 5th to the 3rd speed such that the appropriate engine braking force is applied in accordance with the running state of the vehicle.

Upon release of the accelerator pedal 32 from the depressed state during running in the 5th speed in the shift range 5, the vehicle acceleration gbef exceeds the first acceleration reference value in the non-accelerations state regg1 when the running resistance is relatively small with respect to the driving force obtained in the 5th speed owing to the steep downhill. In other words, the vehicle runs in the accelerated state even if the accelerator pedal is released.

If the running resistance in the aforementioned vehicle running state is relatively high with respect to the driving force obtained in the 3rd speed as being two stages lower, the acceleration after shifting gaf becomes smaller than the second acceleration reference value in the non-acceleration state dcafg. Accordingly, it is estimated that downshifting to the 3rd speed may provide higher engine braking force such that the vehicle is brought into the deceleration state at higher rate.

When the downshifting SD is performed once in the aforementioned state by the vehicle operator who intends to further decelerate, the shift range is shifted from the range 5 to the range 3, and accordingly the gear is downshifted from the 5th to the 3rd speed.

If the vehicle operator performs the downshifting SD once for the purpose of obtaining higher engine braking force upon running on the steep downhill, the gear is shifted down from the 5th to the 3rd speed such that the appropriate engine braking force is applied in accordance with the vehicle running state.

Meanwhile, if the running resistance is relatively low with respect to the driving force obtained in the 3rd speed as being two stages lower, the acceleration after shifting gaf becomes equal to or larger than the second acceleration reference value in the non-acceleration state dcafg. That is, it is estimated that high engine braking force is not obtained even if the downshifting from the 5th to the 3rd speed is performed, and therefore, the vehicle is in the state of deceleration at lower rates.

When the downshifting SD is performed once in the aforementioned state by the vehicle operator who intends to further decelerate, the shift range is shifted from the range 5 to the range 2, and accordingly the gear is downshifted from the 5th to the 2nd speed.

If the vehicle operator performs the downshifting SD once for the purpose of obtaining higher engine braking force upon running on the steep downhill in the 5th speed in the shift range 5 at the manual shift mode, the gear is directly shifted down from the 5th to the 2nd speed. As a result, the appropriate engine braking force is applied in accordance with the vehicle running state.

(Intention of the Vehicle Operator to Accelerate)

In the case where the vehicle is running in the range 5 at the manual shift mode, and the 5th speed is set by the T-ECU 15 in accordance with the current running state, when the vehicle operator depresses the accelerator pedal 32 for the purpose of acceleration, the accelerator opening tap becomes equal to or larger than an accelerator operation reference value tap 1.

If the vehicle is running on the gentle uphill against the relatively small running resistance to the vehicle driving force obtained in the 5th speed, the current vehicle acceleration gbef exceeds the first acceleration reference value in acceleration state regg2. That is, upon depression of the accelerator pedal 32, the acceleration that is equal to or higher than a certain level is applied to the vehicle, thus bringing the vehicle into the acceleration state.

In the case where the shift range is changed to the range 4 having the highest gear as being one stage lower than the 5th speed, that is, 4th speed, and the running resistance becomes relatively large to the vehicle driving force obtained in the 4th speed that has been changed from the 5th speed accordingly, the acceleration after shifting gaf exceeds the second acceleration reference value in acceleration state acafg. That is, it is estimated that the downshifting to the 4th speed may bring the vehicle into the state where higher acceleration is obtained so as to be applied to the vehicle.

When the vehicle operator performs the downshifting SD once in the aforementioned state for the purpose of further acceleration, the shift range is changed from the range 5 to the range 4, and the gear stage is accordingly downshifted from the 5th to the 4th speed.

In the case where the vehicle runs on the gentle uphill in the 5th speed in the selected range 5 at the manual shift mode, when the vehicle operator performs the downshifting SD once for the purpose of further acceleration, the gear stage is changed from the 5th to the 4th speed such that appropriate driving force is applied in accordance with the vehicle running state.

When the running resistance is relatively large with respect to the driving force obtained in the 4th speed as being one stage lower, the acceleration after shifting gaf becomes equal to or smaller than the second acceleration reference value in the non-acceleration state acafg. That is, it is estimated that in the aforementioned state, high acceleration is not obtained even if the downshifting to the 4th speed is performed, and the vehicle acceleration is kept from being increased.

Then if the vehicle operator performs the downshifting SD for the purpose of applying further higher acceleration, the shift range is shifted from the range 5 to range 3, and accordingly the gear is directly changed from the 5th to the 3rd speed.

When the vehicle operator performs the downshifting SD once for obtaining further acceleration upon running on the steep uphill, the gear is shifted from the 5th to the 3rd speed such that the appropriate driving force is applied in accordance with the running state of the vehicle.

Upon depression of the accelerator pedal 32 during running in the 5th speed in the range 5, the vehicle acceleration gbef becomes equal to or smaller than the first acceleration reference value in the non-acceleration state regg2 when the running resistance becomes relatively large with respect to the driving force obtained in the 5th speed upon running on the steep uphill. In other words, the vehicle acceleration is not increased even if the accelerator pedal 32 is depressed.

If the running resistance in the aforementioned vehicle running state is relatively small with respect to the driving force obtained in the 3rd speed as being two stages lower, the acceleration after shifting gaf exceeds the second acceleration reference value in the non-acceleration state acafg. Accordingly, it is estimated that downshifting to the 3rd speed may provide higher acceleration such that the vehicle is brought into the running state at higher acceleration rates.

When the downshifting SD is performed once in the aforementioned state by the vehicle operator who intends to further accelerate, the shift range is shifted from the range 5 to the range 3, and accordingly the gear is downshifted from the 5th to the 3rd speed.

If the vehicle operator performs the downshifting SD once for the purpose of obtaining further acceleration upon running on the steep uphill, the gear is downshifted from the 5th to the 3rd speed such that the appropriate driving force in accordance with the vehicle running state is applied.

Meanwhile, if the running resistance is relatively large with respect to the driving force obtained in the 3rd speed as being two stages lower, the acceleration after shifting gaf becomes equal to or smaller than the second acceleration reference value in the non-acceleration state acafg. That is, it is estimated that the required acceleration is not obtained even if the downshifting from the 5th to the 3rd speed is performed, and accordingly the vehicle is not brought into the running state at higher acceleration rates.

When the downshifting SD is performed once in the aforementioned state by the vehicle operator who intends to further accelerate, the shift range is shifted from the range 5 to the range 2, and the gear is downshifted from the 5th to the 2nd speed.

If the vehicle operator performs the downshifting SD once for obtaining higher acceleration upon running on the steep uphill in the 5th speed in the shift range 5 at the manual shift mode, the gear is directly downshifted from the 5th to the 2nd speed. As a result, the appropriate driving force in accordance with the vehicle running state is applied.

(Effect)

The effect obtained from the above-described embodiment will be explained.

(5) According to the embodiment, upon downshifting SD once in the state where the vehicle operator releases the accelerator pedal 32 during running at the manual shift mode, the shift range is shifted to the range where more appropriate engine braking force is obtained. Therefore the vehicle operator does not have to perform the downshifting SD twice or more for establishing the gear stage in which the required higher engine braking force is obtained.

If the vehicle operator performs downshifting SD once while depressing the accelerator pedal 32, the shift range is shifted down to the range where more appropriate driving force is obtained. As a result, the vehicle operator does not have to perform the downshifting SD twice or more for establishing the gear stage in which the required higher engine braking force is obtained.

Meanwhile, in the automatic transmission including a manual shift mode of a general range hold type, the shift range is changed to the one having the highest gear as being one stage higher at every upshifting SU, or the shift range is changed to the one having the highest gear as being one stage lower at every downshifting SD.

In the aforementioned technology, even if the downshifting SD is operated once during running at the manual shift mode, downshifting to the gear stage in which the required higher engine braking force or acceleration cannot be established. Accordingly, the downshifting SD has to be further performed once or twice.

This embodiment makes it possible to reduce the frequency of downshifting SD to the gear stage intended by the vehicle operator upon running at the manual shift mode.

Fourth Embodiment

Figure 13:
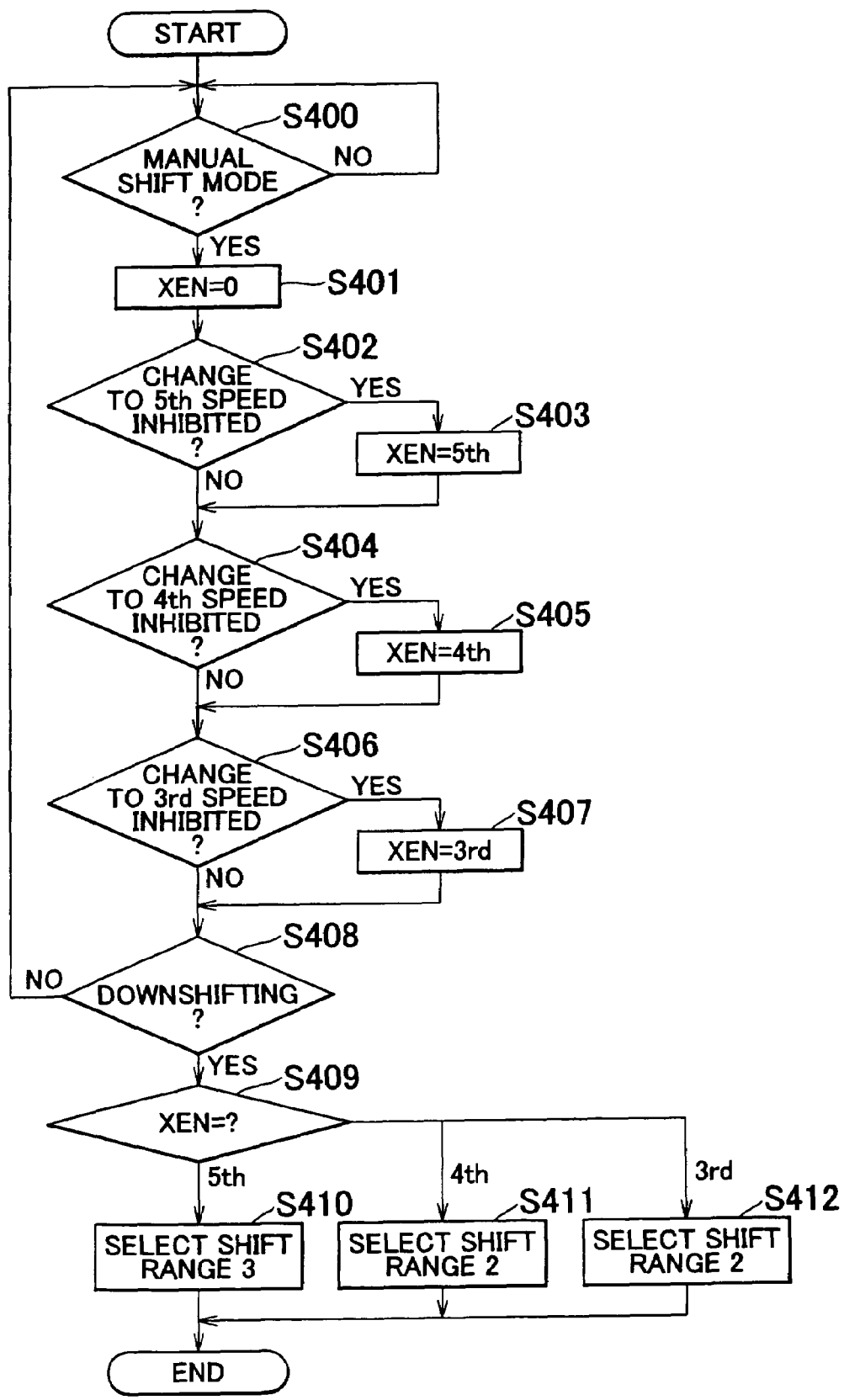
FIG. 13 is a flowchart representing a control routine for setting a fourth shift range in a fourth embodiment.

A fourth embodiment of the invention will be described referring to FIG. 13.

The embodiment is different from the first embodiment in the points as described below.

The uphill/downhill control is performed in the manual shift mode; and

The fourth shift range set control is executed under the uphill/downhill control executed at the manual shift mode.

The elements constituting the structure, which are identical to those in the first embodiment will be designated with the same reference numerals, and each explanation of those elements, therefore, will be omitted. The explanation of the aforementioned two different points are explained hereinafter.

In this embodiment, the T-ECU 15 serves to set the gear stage upon manual shifting, set the shift range upon manual shifting, and limit the gear stage upon manual shifting.

(Uphill/Downhill Running Control)

The T-ECU 15 executes the uphill/downhill running control in which the highest gear in the currently set shift range is limited to the one to be lower than the highest gear in the currently set shift range based on the slope resistance to the vehicle that runs uphill/downhill at the manual shift mode.

The uphill/downhill running control is a generally employed technology. In this embodiment, the slope resistance resulting from running on the uphill/downhill is detected on the basis of the throttle opening TH and the vehicle acceleration. The slope resistance resulting from running on the uphill/downhill constitutes the third vehicle operation information.

More specifically, in the case where the gear stage is set to the 4th speed in the shift range 5 at the manual shift mode, when the detection value (positive) of the slope resistance resulting from running on the uphill becomes equal to or greater than a predetermined first slope reference value, setting of the gear to the 5th speed is inhibited by limiting the highest gear to the 4th speed.

In the case where the gear stage is set to the 3rd speed in the shift range 4 or 5, when the detection value of the slope resistance resulting from running on the uphill becomes equal to or greater than a second slope reference value that is larger than the first reference value, setting of the gear to the 4th speed is inhibited by limiting the highest gear to the 3rd speed.

In the case where the gear stage is set to the 2nd speed in one of the shift range 3, 4 and 5, when the detection value of the slope resistance resulting from running on the uphill becomes equal to or greater than a third slope reference value that is larger than the second reference value, setting of the gear to the 3rd speed is inhibited by limiting the highest gear to the 2nd speed.

In the case where the gear stage is set to the 4th speed in the shift range 5 at the manual shift mode, when the detection value (negative) of the slope resistance resulting from running on the downhill becomes equal to or greater than a fourth slope reference value, setting of the gear to the 5th speed is inhibited by limiting the highest gear to the 4th speed.

In the case where the gear stage is set to the 3rd speed in the shift range 4 or 5, when the detection value of the slope resistance resulting from running on the downhill becomes equal to or greater than a fifth slope reference value that is larger than the fourth reference value, setting of the gear to the 4th speed is inhibited by limiting the highest gear to the 3rd speed.

In the case where the gear stage is set to the 2nd speed in one of the shift ranges 3, 4, and 5, when the detection value of the slope resistance resulting from running on the downhill becomes equal to or greater than a sixth slope reference value that is larger than the fifth reference value, setting of the gear to the 3rd speed is inhibited by limiting the highest gear to the 2nd speed.

The T-ECU 15 executes the fourth shift range set control in which the shift range set upon downshifting SD under the uphill/downhill running control at the manual shift mode is established on the basis of the limited highest gear stage.

In the embodiment, the highest gear stage limited under the uphill/downhill running control constitutes the fourth vehicle operation information. Under the fourth shift range set control, the T-ECU 15 sets the shift range to the range having the highest gear as being one stage lower than the highest gear limited under the uphill/downhill running control.

(Fourth Shift Range Set Control)

The routine for the fourth shift range set control will be described referring to a flowchart shown in FIG. 13.

First in S400, it is determined whether the shift mode is set to the manual shift mode on the basis of the shift position SP. If NO is obtained in S400, that is, the manual shift mode is not set, the process returns. If YES is obtained in S400, that is, the manual shift mode is set, the process proceeds to S401 where a gear set inhibition flag XEN is cleared.

Then in S402, it is determined whether the shift range 5 is currently set, and the upshifting to the 5th speed is inhibited under the uphill/downhill running control such that the 4th gear is set.

If YES is obtained in S402, that is, the upshifting to the 5th speed is inhibited, the process proceeds to S403 where the gear set inhibition flag XEN is set to 5th, and the process proceeds to S404.

If NO is obtained in S402, that is, upshifting to the 5th speed is not inhibited, the process proceeds to S404. In S404, it is determined whether the shift range 5 or 4 is currently set, and the upshifting to the 4th speed is inhibited under the uphill/downhill running control such that the 3rd speed is set.

If YES is obtained in S404, that is, upshifting to the 4th speed is inhibited, the process proceeds to S405 where the gear set inhibition flag XEN is set to 4th, and the process proceeds to S406.

If NO is obtained in S404, that is, upshifting to the 4th speed is not inhibited, the process proceeds to S406. In S406, it is determined whether one of the shift ranges 5, 4, and 3 is currently set, and the upshifting to the 3rd speed is inhibited under the uphill/downhill running control such that the 2nd speed is set.

If YES is obtained in S406, that is, upshifting to the 3rd speed is inhibited, the process proceeds to S407 where the gear set inhibition flag XEN is set to 3rd, and the process proceeds to S408.

If NO is obtained in S406, that is, upshifting to the 3rd speed is not inhibited, the process proceeds to S408. In S408, it is determined whether the downshifting SD has been performed. If NO is obtained in S408, the process returns to S400 from where the control routine is executed repeatedly.

If YES is obtained in S408, that is, the downshifting SD has been performed, the process proceeds to S409 where the gear that has been set corresponding to the gear set inhibition flag XEN is determined. If the gear set inhibition flag XEN is set to the 5th speed, the process proceeds to S410 where the currently set shift range 5 is shifted to the shift range 3, and accordingly the gear stage is downshifted from the 4th to the 3rd speed.

If the gear set inhibition flag XEN is set to the 4th speed, the process proceeds to S411 where the currently set shift range 5 or 4 is shifted to the shift range 2, and accordingly the gear stage is shifted from the 3rd to the 2nd speed.

If the gear set inhibition flag XEN is set to the 3rd speed, the process proceeds to S412 where the currently set shift range 5, 4, or 3 is shifted to the shift range 2, and accordingly the 2nd speed is held.

(Operation)

Operations of the above-structured embodiment will be described. In the case where the vehicle is running in the 4th speed in the shift range 5 at the manual shift mode, upon running on the gentle uphill, the uphill/downhill running control starts under which upshifting to the 5th speed is inhibited such that the 4th speed is held.

If the vehicle operator performs the downshifting SD once for the higher force in the aforementioned case, the shift range 5 is shifted to the range 3, and accordingly the 4th speed is downshifted to the 3rd speed.

Accordingly if the downshifting SD is further performed once for requiring the higher driving force upon running on the gentle uphill in the 4th speed in the shift range 5 at the manual shift mode, the gear stage is downshifted from the 4th to the 3rd speed.

In the case where the vehicle is running in the 3rd speed in the shift range 5 or 4 at the manual shift mode, upon running on the relatively steep uphill, the uphill/downhill running control starts under which upshifting to the 4th speed is inhibited such that the 3rd speed is held.

If the vehicle operator performs downshifting SD once for requiring higher driving force in the aforementioned case, the shift range 4 is shifted to the range 2, and accordingly the 3rd speed is downshifted to the 2nd speed.

Accordingly upon running on the relatively steep uphill in the 3rd speed in the shift range 5 or 4 at the manual shift mode, the gear stage is downshifted from the 3rd speed to the 2nd speed by a single downshifting SD for requiring higher driving force.

In the case where the vehicle is running in the 2nd speed in the shift range 5, 4, or 3 at the manual shift mode, upon running on the steep uphill, the uphill/downhill running control starts under which upshifting to the 3rd speed is inhibited such that the 2nd speed is held.

If the vehicle operator performs downshifting SD once for requiring higher driving force in the aforementioned case, the shift range 3 is shifted to the range 2, and accordingly the gear stage is held in the 2nd speed.

Accordingly upon running on the steep uphill in the 2nd speed in the shift range 5, 4, or 3 at the manual shift mode, the gear stage is not downshifted to the 1st speed but held in the 2nd speed even if the downshifting SD is performed once for requiring the higher driving force.

If the downshifting SD is performed in the vehicle running state at the manual shift mode where the uphill/downhill running control is not executed because of small slope resistance, the currently set shift range is shifted down to the range having the highest gear as being one stage lower under the normal manual shift control.

If the downshifting SD is performed so as to prevent upshifting to the 5th speed upon acceleration immediately after selecting the shift range 5, the manual shift control for downshifting the gear from the currently set speed is not executed.

(Effect)

The effects obtained from the aforementioned embodiment will be described.

(5) If the uphill/downhill running control is executed at the manual shift mode so as to inhibit setting of the gear stage as being lower than the highest gear in the currently set shift range, a single downshifting SD (manual shift operation) allows downshifting to the gear stage at which higher driving force is obtained. This makes it possible to avoid the failure in downshifting to the required gear stage even if the downshifting SD is performed for requiring higher engine braking force or driving force.

If the uphill/downhill running control is not executed at the manual shift mode, the shift range is shifted down to the range having the highest gear as being one stage lower than that in the currently set shift range at every performance of downshifting SD. In the case where the downshifting SD is performed to inhibit upshifting to the higher gear stage by the vehicle operator upon acceleration, downshifting to the gear is not performed.

In the automatic transmission including the manual shift mode of general range hold type, even when the vehicle operator performs downshifting SD for requiring higher driving force during running at the manual shift mode under the uphill/downhill running control, downshifting to the gear is not performed. In the case where the shift range having the highest gear that is higher than the inhibited gear is set, the highest gear stage in the range set upon the downshifting SD does not become lower than the required gear stage. In the aforementioned case, the downshifting SD performed once or twice is necessary for downshifting to the gear in which the required driving force is obtained.

In the shift control apparatus disclosed in JP-A-9-14417, the currently set gear is downshifted to the gear as being one stage or two stages lower in response to the downshifting operation. According to this technology, however, in the case where the downshifting is performed by the vehicle operator to inhibit upshifting to the higher gear upon acceleration, the gear is downshifted.

According to the embodiment, downshifting to the gear required by the vehicle operator at the manual shift mode can be performed by reduced frequency of downshifting SD.

Other Embodiments

Embodiments other than those embodiments 1, 2, 3, and 4 will be described.

(a) In the second embodiment, the T-ECU 15 executes a low-temperature control that inhibits upshifting to the gear stage in which the required engine speed NE is not obtained when the cooling water temperature TW as the third vehicle operation information is low upon running at the automatic shift mode as well as the uphill/downhill running control.

The aforementioned low-temperature control is a known technology for limiting the highest gear to, for example, the 3rd speed without upshifting in spite of the vehicle operation state that demands upshifting from the 3rd to the 4th speed under the automatic shift control when the water temperature TW is smaller than a predetermined first water temperature reference value. If the water temperature TW is smaller than a second water temperature reference value larger than the first water temperature reference value, upshifting from the 4th to the 5th speed is not performed so as to limit the highest gear to the 4th speed. Upon change in the shift mode from the automatic shift mode to the manual shift mode, the T-ECU 15 serves to set the shift range having the highest gear as being the limited gear (second vehicle operation information) under the low-temperature control.

Even if the highest gear limited under the low-temperature control at the automatic shift mode is different, the shift range having the highest gear corresponding to the limited highest gear is set upon change in the shift mode to the manual mode. This makes it possible to avoid setting of the gear stage that fails to provide the required engine speed sufficient for increasing the water temperature after changing the shift mode to the manual shift mode. Accordingly the gear stage in which the required higher driving force or the engine braking force is obtained can be established by only a single downshifting at the manual shift mode.

(b) In the aforementioned embodiment, an ATF temperature control is executed such that upshifting from a certain gear stage is inhibited when the temperature of the lubricating oil (ATF) for the automatic transmission as the third vehicle operation information is low as well as the low-temperature control. In the case where the highest gear is limited at the automatic shift mode under the ATF temperature control, the shift range having the highest gear limited under the ATF temperature control after changing from the automatic to the manual shift mode is set. In this case, even if the highest gear limited under the ATF temperature control at the automatic shift mode is different from the highest gear at the manual shift mode, the shift range having the highest gear as being limited can be set. As a result, a single downshifting SD at the manual shift mode makes it possible to establish the gear in which the higher driving force or the engine braking force required by the vehicle operator is obtained.

(c) In the first embodiment, an engine load resulting from the change in the shift mode from the automatic mode to the manual mode may be used as the second vehicle operation information instead of the vehicle speed V, based on which the shift range after changing the shift mode is set. The engine load may be estimated on the basis of the throttle opening TH and the engine speed NE, for example. In the aforementioned case under the first shift range set control as shown in the flowchart 15A, it is determined whether the engine load EGLD is equal to or larger than a first load reference value EGLD 1. Then in S104, it is determined whether the engine load EGLD is equal to or larger than a second load reference value EGLD2 that is smaller than the first load reference value EGLD1. Execution of the aforementioned steps makes it possible to classify the engine load EGLD into three states, that is, a high load state where the 3rd speed is selected at the automatic shift mode upon running on the uphill/downhill or towing, a medium load state where the 4th speed is selected, and a low load state where the 5th speed is selected. In the high load state, the 3 range flag sftch3RG is set to 1 in S103. In the medium load state, the 4 range flag sftch4RG is set to 1 in S105. In the low load state, the 5 range flag sftch5RG is set to 1 in S106. In the above-structured embodiment, the similar effects to those described in (1) to (3) in the first embodiment can be obtained.

In this embodiment, the slope resistance (running resistance) may be used instead of the engine load. The slope resistance may be estimated from the throttle opening TH and the vehicle acceleration derived from the vehicle speed V.

Figure 15A:
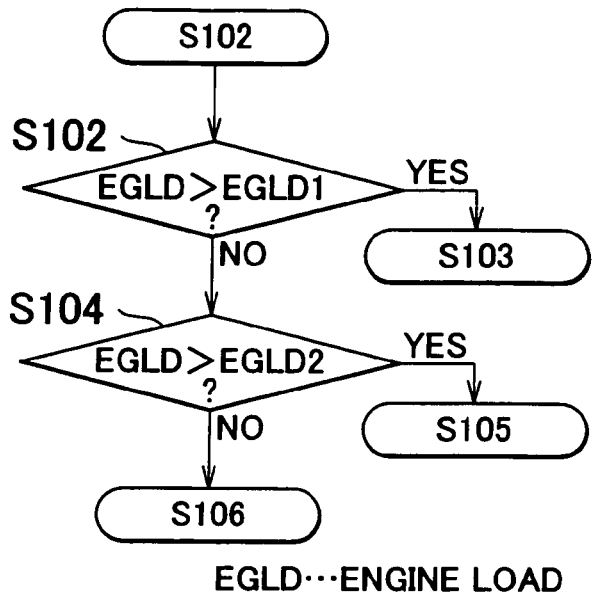
FIGS. 15A and 15B are flowcharts representing control routines for setting the first shift range in other embodiment.
Figure 15B:
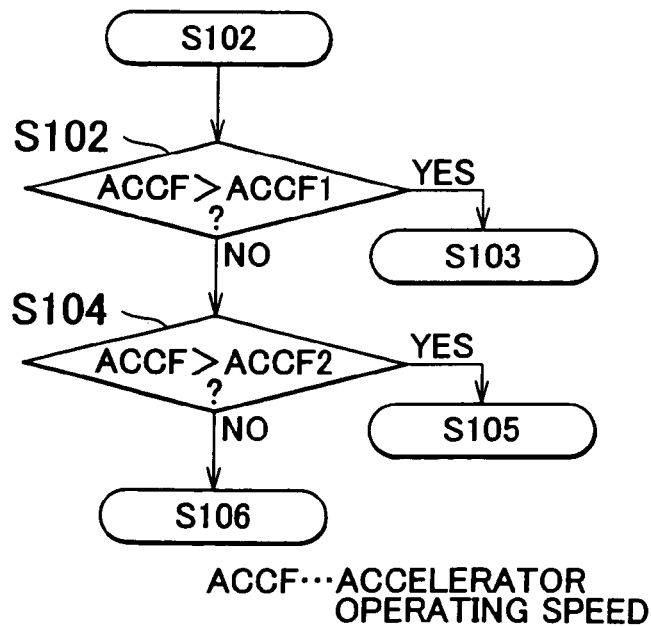

(d) In the first embodiment, a speed for depressing the accelerator pedal or an accelerator operation speed upon change in the shift mode from the automatic mode to the manual mode may be used as the second vehicle operation information instead of the vehicle speed V, based on which the shift range after changing the shift mode is set. The speed for depressing the accelerator pedal may be derived from the amount of change in the accelerator opening per unit of time. In the aforementioned case under the first shift range set control, as shown in the flowchart in FIG. 15B, it is determined whether the accelerator operation speed ACCF is equal to or greater than a first speed reference value ACCF1 in S102. Then in S104, it is determined whether the speed for depressing the accelerator pedal ACCF is smaller than a second speed reference value ACCF2 that is smaller than the first speed reference value ACCF 1. Execution of the aforementioned steps makes it possible to classify the speed for depressing the accelerator pedal ACCF into three states, that is, a high speed state required by the vehicle operator for the highest acceleration torque, a medium speed for the next highest acceleration torque, and a low speed for the higher acceleration torque. In the high speed state, the 3 range flag sftch3RG is set to 1 in S103. In the medium speed state, the 4 range flag sftch4RG is set to 1 in S105. In the low speed state, the 5 range flag sftch5RG is set to 1 in S106. In the above-structured embodiment, the similar effects to those described in (1) to (3) in the first embodiment can be obtained.

A speed for releasing the accelerator pedal (accelerator pedal operation speed) may be used as the second vehicle operation information instead of the speed for depressing the accelerator pedal.

(e) The second embodiment may be structured such that only the second shift range set control is executed. The third embodiment may be structured such that only the third shift range set control is executed. The fourth embodiment may be structured such that only the fourth shift range set control is executed. The first embodiment may be structured such that the first to the fourth shift range set controls are executed.

(f) According to the first to the fourth embodiments, the T-ECU 15 sets the gear selected based on the second vehicle operation information upon change in the shift mode from the automatic to the manual mode, and then holds the set gear. The T-ECU 15 further sets the gear to be one stage higher or lower by the downshifting SD or upshifting SU at the manual shift mode. The manual shift mode is set in the shift control apparatus of gear hold type, not of the range hold type as in the first to the fourth embodiments. According to the aforementioned structure, the effects as described in (1) and (3) of the first embodiment will be obtained.

(g) The fourth embodiment is structured so as to set the shift range shifted down to the lower range by the downshifting SD upon running at the manual shift mode on the basis of the speed for depressing the accelerator pedal 32 (fourth vehicle operation information).

Figure 14:
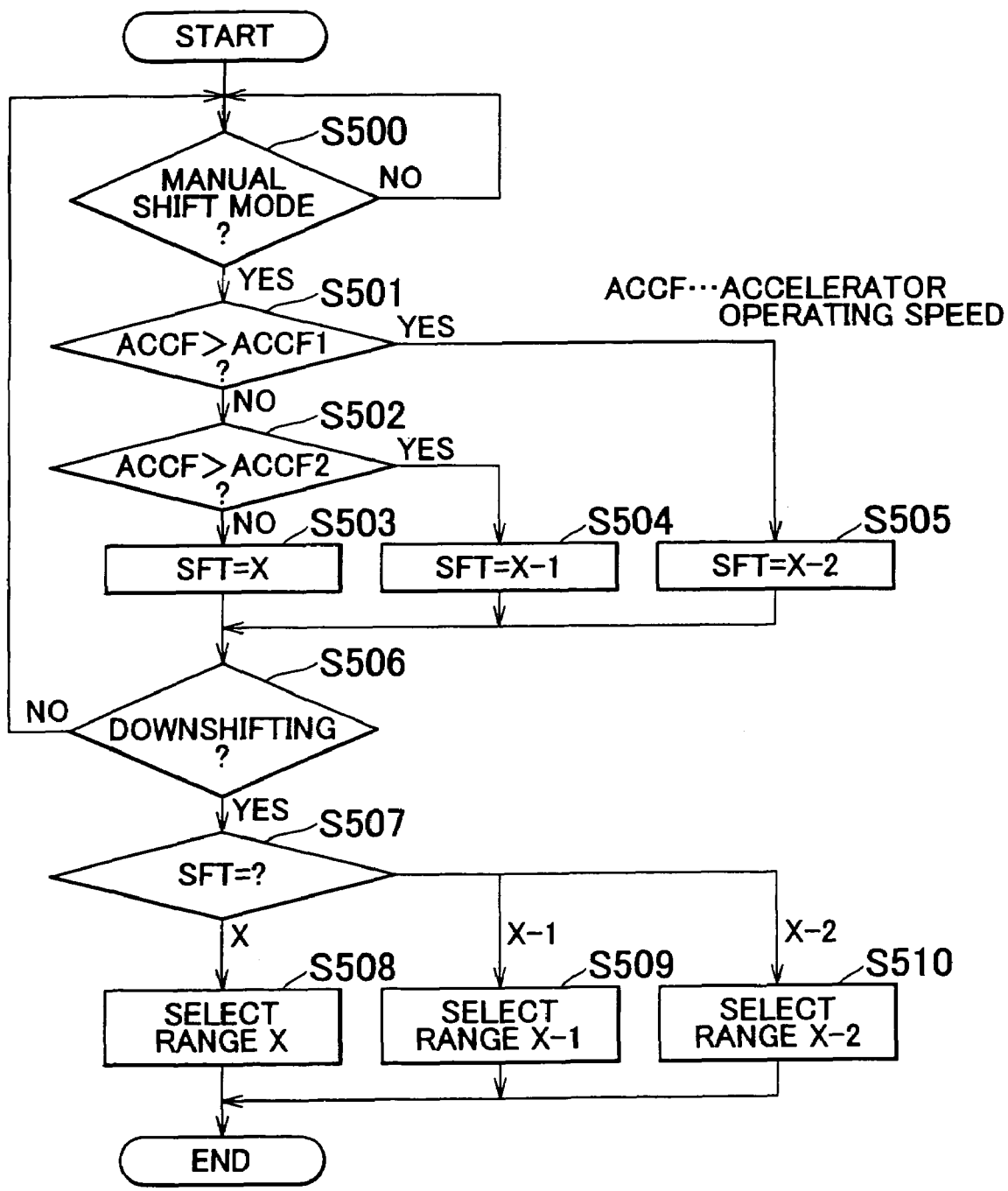
FIG. 14 is a flowchart representing a control routine for setting a third shift range in other embodiment.

Referring to the flowchart of FIG. 14, if it is determined that the manual shift mode has been set in S500, the process proceeds to S501 where it is determined whether the accelerator pedal depression speed ACCF exceeds the first speed reference value ACCF1. Then in S502, it is determined whether the ACCF exceeds the second speed reference value ACCF2 that is smaller than the ACCF1. In the aforementioned execution of steps S501 and S502, the ACCF is determined as being in one of the three speed ranges, that is, high-speed, medium-speed, and low-speed ranges, respectively. Then in S503, S504, and S505, the shift range to be selected in accordance with the determined speed range is set, respectively. More specifically, if the ACCF is determined as in the high-speed range, the process proceeds to S505 where the shift range is shifted to the three-stage lower than the currently set range. If the ACCF is determined as in the medium-speed range, the process proceeds to S504 where the shift range is shifted to the two-stage lower than the currently set range. If the ACCF is determined as in the low-speed range, the process proceeds to S503 where the shift range is shifted to the one-stage lower than the currently set range. When the downshifting SD is detected in S506, the shift range is shifted down to the range set in accordance with the ACCF in S507, S508, S509, and S510. If the set shift range becomes lower than the range L, the shift range is set to L.

The embodiment is structured to set the shift range to be shifted down in accordance with the degree of acceleration desired by the vehicle operator, which is estimated on the basis of the ACCF upon downshifting SD while depressing the accelerator pedal 32. Therefore downshifting to the desired gear stage can be established requiring reduced frequency of the downshifting SD.

The embodiment may be structured to set the shift range to be shifted down in accordance with the brake operation force (fourth vehicle operation information) applied to the brake pedal instead of the ACCF. In this case, the embodiment is structured to set the shift range to be shifted down in accordance with the degree of deceleration required by the vehicle operator, which is estimated on the basis of the brake operation force upon downshifting SD while depressing the brake pedal.

Figure 16:
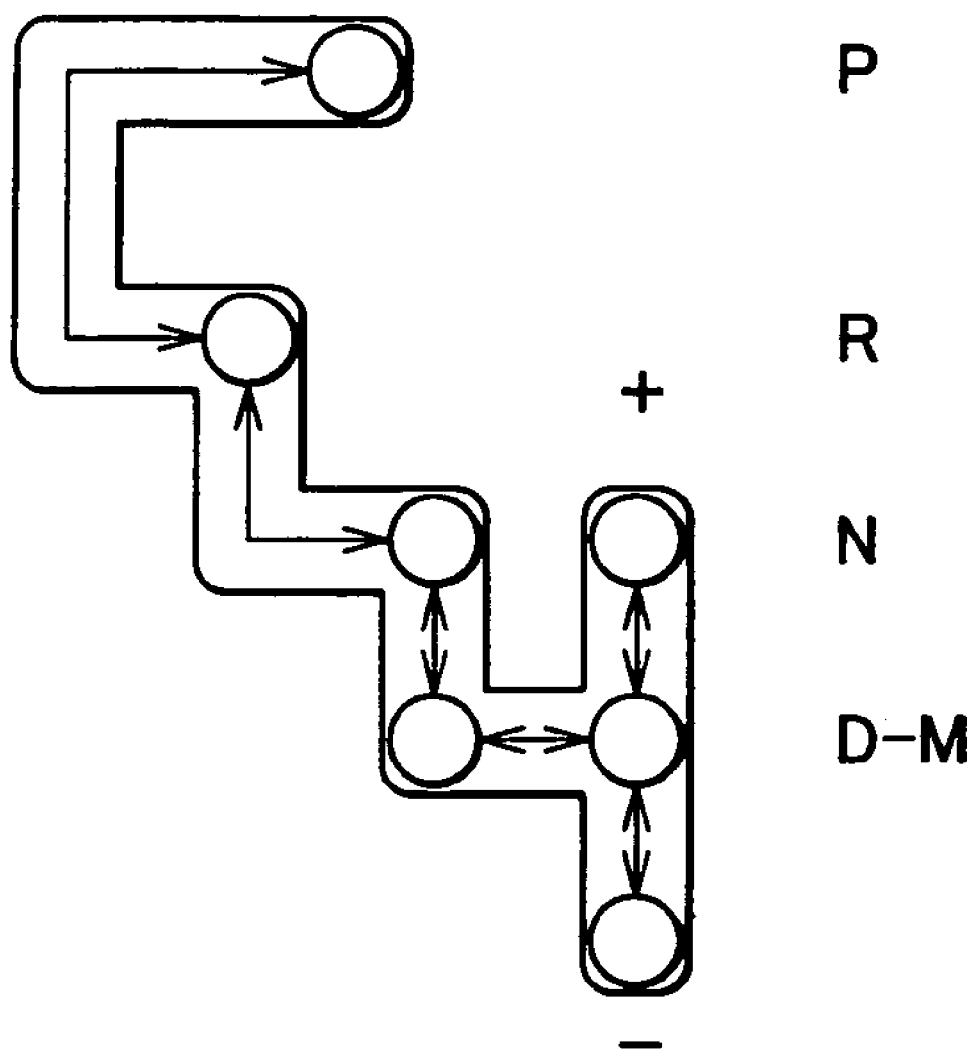
FIG. 16 is a schematic view of the shift device according to other embodiment.

(h) In the first to the fourth embodiments, the downshifting SD and upshifting SU at the manual shift mode may be executed using the shift device. Referring to FIG. 16, the shift device includes a position (+) for upshifting and a position (−) for downshifting both selectively operated from the position M. The upshifting SU is performed by temporarily selecting the position from M to (+), and downshifting SD is performed by temporarily selecting the position from M to (−), respectively.

(Other Technical Concepts)

The technical concepts understood from the aforementioned embodiments will be described hereinafter.

(1) In an embodiment of the shift control apparatus for a vehicular automatic transmission, the second vehicle operation information includes at least one of a vehicle speed, a running resistance, an engine load, and an accelerator pedal operating speed. The running resistance includes a slope resistance upon running on the uphill/ downhill. The accelerator pedal operation speed includes the speeds for depressing/releasing the accelerator pedal by the vehicle operator. According to the aforementioned structure, the appropriate shift range is set upon change in the shift mode to the manual mode on the basis of the vehicle running state that can be determined from the vehicle speed, running resistance or the engine load, and the intention of the vehicle operation that can be estimated from the accelerator pedal operation speed.

(2) In an embodiment, the fourth vehicle operation information includes at least one of an accelerator opening, an engine load, an engine torque, a vehicle driving force, a vehicle speed, an accelerator pedal depressing speed, and a brake operating force. According to the aforementioned structure, the appropriate shift range is set upon manual shift operation on the basis of the intention of the vehicle operator for deceleration that can be estimated from the accelerator opening, accelerator pedal operation speed, or the brake operation force as well as the vehicle running state that can be determined from the engine load, engine torque, vehicle driving force, vehicle speed or the vehicle acceleration.

(3) In a still further embodiment, the T-ECU 15 serves to set the gear stage in the shift range having the highest gear stage corresponding to the one set at the manual shift mode on the basis of the first vehicle operation information (vehicle speed V). In the embodiment, the highest gear stage in the shift range is upshifted to the higher gear by the upshifting SU performed by manual shift operation, and is downshifted to the lower gear by the downshifting SD. This makes it possible to provide the effects similar to those obtained in the third embodiment.

(4) In the embodiment, the second vehicle operation information includes at least one of the vehicle speed, running resistance, engine load (EGLD), and an accelerator pedal operation speed ACCF (speed for depressing the accelerator pedal). According to the aforementioned structure, the effects similar to those as described in the technical concept (1) may be obtained.

(5) In the aforementioned technology, at the automatic shift mode, the T-ECU 15 limits the highest gear stage set on the basis of the first vehicle operation information to be lower stage based on the third vehicle operation information. The second vehicle operation information includes the highest gear limited by the T-ECU 15. In the embodiment, the shift range having the highest gear corresponding to the limited highest gear is set. This makes it possible to provide the similar effects as those obtained in the embodiment.

(6) The third vehicle operation information includes a slope resistance to the vehicle that runs uphill/downhill. In the embodiment, the gear stage is limited to the lower stage based on the slope resistance. This makes it possible to provide the similar effects as those obtained in the embodiment.

(7) The third vehicle operation information includes a temperature of cooling water for cooling the internal combustion engine, or a temperature of oil for the automatic transmission. In the embodiment, the gear stage is limited to the lower stage on the basis of the cooling water temperature or the oil temperature. This makes it possible to provide the similar effects as those obtained in the embodiment.

(8) The shift control apparatus for a vehicular automatic transmission includes an automatic shift mode where the gear stage is set based on the first vehicle operation information for selecting the gear stage, and a manual shift mode where the gear stage is set upon manual shifting operations. Selection between the automatic shift mode and the manual shift mode is manually performed. In the shift control apparatus, the gear stage upon selection in the shift mode from the automatic to the manual mode is set in accordance with the second vehicle operation information that is different from the first vehicle operation information. The gear stage to be set upon manual shift operation at the manual shift mode is established based on the fourth vehicle operation information. This makes it possible to provide the similar effects as those in the embodiments.

(9) The shift control apparatus for a vehicular automatic transmission includes an automatic shift mode where the gear stage is set on the basis of the first vehicle operation information for selecting the gear stage, and a manual shift mode where the shift range having the gear stage to be set based on the first vehicle operation information. Selection between the automatic and manual shift modes is manually performed. In the shift control apparatus, the shift range upon selection of the shift mode from the automatic to the manual mode is set on the basis of the second vehicle operation information that is different from the first vehicle operation information. In the shift control apparatus, the shift range upon manual shift operation at the manual shift mode is set based on the fourth vehicle operation information. This makes it possible to provide effects as those in the embodiments.

(10) One of the aforementioned embodiments and technical concepts includes a first unit for obtaining the first vehicle operation information including the throttle opening sensor 25 and a vehicle speed sensor 26, a unit allowing a manual selection of the shift mode between the manual and automatic mode, that is, the shift device 12, an automatic shift unit that sets the gear speed for the automatic transmission based on the first vehicle operation information at the automatic shift mode, that is, T-ECU 15, a second unit for obtaining the second vehicle operation information including the water temperature sensor 23 and the vehicle speed sensor 26, and a unit for detecting manual shift operation at the manual shift mode including the upshift switch 13, and the downshift switch 14.

(11) One of the aforementioned embodiments and technical concepts includes a first unit for obtaining the first vehicle operation information including the throttle opening sensor 25 and the vehicle speed sensor 26, a unit allowing a manual selection of the shift mode between the manual and automatic mode, that is, shift device 12, an automatic shift unit that sets the gear speed for the automatic transmission on the basis of the first vehicle operation information at the automatic shift mode, that is, T-ECU 15, a fourth unit for obtaining the fourth vehicle operation information including the vehicle speed sensor 26 and the accelerator opening sensor 33, and a unit for detecting manual shift operation at the manual shift mode including the upshift switch 13 and the downshift switch 14.

What is claimed is:

1. A shift control apparatus for a vehicular automatic transmission, comprising a controller that:
sets an automatic shift mode in which a gear stage is established based on a first vehicle operation information used for selecting a gear stage of the automatic transmission, and a manual shift mode in which the gear stage is established by a manual shift operation, the shift mode being manually selected between the automatic shift mode and the manual shift mode, and sets the gear stage upon the manual shift operation at the manual shift mode based on a fourth vehicle operation information, wherein the fourth vehicle operation information includes a current vehicle acceleration and an acceleration after the manual shift operation at which the gear stage set upon shifting of the shift range to have the highest gear limited to be at least one stage lower is established.

2. A shift control apparatus according to claim 1, further comprising:

a first vehicle operation information detecting unit that detects the first vehicle operation information;

a mode set unit that sets one of the automatic shift mode and the manual shift mode by the manual shift operation;

a fourth vehicle operation information detecting unit that detects the fourth vehicle operation information; and a manual operation detecting unit that detects the manual shift operation at the manual shift mode.

3. A shift control apparatus for a vehicular automatic transmission, comprising a controller that:

sets an automatic shift mode in which a gear stage is established based on a first vehicle operation information used for selecting a gear stage of the automatic transmission, and a manual shift mode in which a shift range having the gear stage established based on the first vehicle operation information is selected by a manual shift operation, the shift mode being manually selected between the automatic shift mode and the manual shift mode, and sets the shift range upon the manual shift operation at the manual shift mode based on a fourth vehicle operation information, wherein the fourth vehicle operation information includes a current vehicle acceleration and an acceleration after the manual shift operation at which the gear stage set upon shifting of the shift range to have the highest gear limited to be at least one stage lower is established.

4. A shift control apparatus according to claim 3, further comprising:

a first vehicle operation information detecting unit that detects the first vehicle operation information;

a mode set unit that sets one of the automatic shift mode and the manual shift mode by the manual shift operation;

a fourth vehicle operation information detecting unit that detects the fourth vehicle operation information; and a manual operation detecting unit that detects the manual shift operation at the manual shift mode.

5. A shift control apparatus according to claim 3, wherein the fourth vehicle operation information comprises at least one of an accelerator opening, an engine load, an engine torque, a vehicle driving force, a vehicle speed, an accelerator pedal depressing speed, and a brake operating force.

6. A shift control apparatus according to claim 3, wherein the manual shift operation is a downshifting operation; and the fourth vehicle operation information further includes an accelerator opening caused by the downshifting operation.

7. A shift control apparatus according to claim 3, wherein:

the controller limits a highest gear stage set by the manual shift operation at the manual shift mode so as to be at least one stage lower than the highest gear in the shift range based on a third vehicle operation information, and sets the shift range having a highest gear stage that is one stage lower than the limited highest gear stage set upon the downshifting operation performed by the manual shift operation; and the fourth vehicle operation information comprises the highest gear stage limited to be at least one stage lower.

8. A shift control apparatus according to claim 7, wherein the third vehicle operation information comprises a slope resistance to the vehicle that runs one of uphill and downhill; and the controller limits the highest gear stage to be at least one stage lower than the highest gear stage in the shift range based on the slope resistance.

9. A shift control method for a vehicular automatic transmission comprising:

setting an automatic shift mode in which a gear stage is established based on a first vehicle operation information used for selecting a gear stage of the automatic transmission, and a manual shift mode in which the gear stage is established by a manual shift operation, the shift mode being manually selected between the automatic shift mode and the manual shift mode; and setting the gear stage upon the manual shift operation at the manual shift mode based on a fourth vehicle operation information, wherein the fourth vehicle operation information includes a current vehicle acceleration and an acceleration after the manual shift operation at which the gear stage set upon shifting of the shift range to have the highest gear limited to be at least one stage lower is established.

10. A shift control method for a vehicular automatic transmission comprising:

setting an automatic shift mode in which a gear stage is established based on a first vehicle operation information used for selecting a gear stage of the automatic transmission, and a manual shift mode in which a shift range having the gear stage established based on the first vehicle operation information is selected by a manual shift operation, the shift mode being manually selected between the automatic shift mode and the manual shift mode; and setting the shift range upon the manual shift operation at the manual shift mode based on a fourth vehicle operation information, wherein the fourth vehicle operation information includes a current vehicle acceleration and an acceleration after the manual shift operation at which the gear stage set upon shifting of the shift range to have the highest gear limited to be at least one stage lower is established.

* * * * *